(12) United States Patent
Yanagawa et al.

(10) Patent No.: US 10,040,419 B2
(45) Date of Patent: Aug. 7, 2018

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Wataru Yanagawa, Aichi-ken (JP); Motoki Sugiyama, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 137 days.

(21) Appl. No.: 15/162,117

(22) Filed: May 23, 2016

(65) Prior Publication Data

US 2016/0347276 A1 Dec. 1, 2016

(30) Foreign Application Priority Data

May 27, 2015 (JP) .................................. 2015-107850
May 27, 2015 (JP) .................................. 2015-107851

(51) Int. Cl.
*B60R 22/34* (2006.01)
*B60R 22/28* (2006.01)

(52) U.S. Cl.
CPC .... *B60R 22/3413* (2013.01); *B60R 2022/286* (2013.01); *B60R 2022/288* (2013.01)

(58) Field of Classification Search
CPC .......... B60R 22/3413; B60R 2022/286; B60R 2022/288
USPC ...................................................... 242/374
See application file for complete search history.

(56) References Cited

U.S. PATENT DOCUMENTS

| 8,695,911 | B2 * | 4/2014 | Maekubo | ................ B60R 22/36 242/379.1 |
|---|---|---|---|---|
| 8,789,786 | B2 * | 7/2014 | Maekubo | ............ B60R 22/3413 137/68.23 |
| 9,027,865 | B2 * | 5/2015 | Ukita | .................. B60R 22/3413 242/374 |
| 9,090,229 | B2 * | 7/2015 | Maekubo | ............ B60R 22/4628 |
| 9,573,562 | B2 * | 2/2017 | Yanagawa | ............. B60R 22/341 |
| 9,688,238 | B2 * | 6/2017 | Yanagawa | ........... B60R 22/3413 |
| 2007/0001047 | A1 | 1/2007 | Yasuda et al. | |
| 2008/0203210 | A1 | 8/2008 | Nagata et al. | |
| 2012/0175451 | A1 * | 7/2012 | Yanagawa | ........... B60R 22/3413 242/379.1 |

(Continued)

FOREIGN PATENT DOCUMENTS

DE 10015048 C1 10/2001
EP 1468883 A1 10/2004
JP 2013-001313 A 1/2013

OTHER PUBLICATIONS

The extended European Search Report dated Sep. 28, 2017.
Extended European Search Report EP Application No. 16171230. 2-1503/3098118 dated Nov. 7, 2016.

*Primary Examiner* — Sang K Kim
(74) *Attorney, Agent, or Firm* — Roberts Mlotkowski Safran Cole & Calderon P.C.

(57) ABSTRACT

In a webbing take-up device, a base cartridge receives pressure of gas generated by an MGG, load from a piston that is moved by the pressure of the gas, and reaction force acting on the MGG when gas has been ejected from the MGG. This enables strength retention with respect to the above-described pressure, load, and reaction force to be simplified.

5 Claims, 12 Drawing Sheets

(56) References Cited

U.S. PATENT DOCUMENTS

2015/0175123 A1* 6/2015 Yanagawa ............. B60R 22/341
242/379.1
2015/0175124 A1 6/2015 Yanagawa et al.

* cited by examiner

WEBBING TAKE-UP DEVICE

CROSS-REFERENCE TO RELATED APPLICATION

This application claims priority under 35 USC 119 from Japanese Patent Applications No. 2015-107850, filed May 27, 2015 and No. 2015-107851, filed May 27, 2015, the disclosures of which are incorporated by reference herein.

BACKGROUND

Field of the Invention

The present invention relates to a webbing take-up device including a force limiter member.

Related Art

There is a webbing take-up device that can switch between a state in which a force limiter member is deformed according to rotation of a spool in a pull-out direction, and a state in which the force limiter member is suppressed from deforming according to rotation of the spool in the pull-out direction, due to a movable member such as a piston being moved by a drive force of a drive device such as a gas generator (see, for example, Japanese Patent Application Laid-Open (JP-A) No. 2013-1313).

In such webbing take-up device, the movable member is supported so as to be capable of moving by a support member that supports the force limiter member. However, a portion of the support member, that retains the movable member so as to allow movement thereof, is closed off from a side in a direction orthogonal to the movement direction of the movable member by a closure member such as a sheet that is another member of the support member. Load is applied to the closure member so as to separate the closure member from the support member when the drive device is actuated. Thus, a high joint strength is required between the support member and the closure member, and there is a complex strength maintaining structure.

Further, in this webbing take-up device, an amount of deformation of the force limiter member, according to rotation of the spool in the pull-out direction, is changed due to a prevention member such as a pawl being displaced.

In such webbing take-up device, rotation force of the force limiter member in the pull-out direction is input to the prevention member in a state in which rotation of the force limiter member in the pull-out direction has been prevented by the prevention member. The prevention member is thereby set so as to withstand the rotation force from the force limiter member. The prevention member therefore has a large weight and so on, and it is difficult to reduce output of a prevention release section such as a gas generator for displacing the prevention member.

SUMMARY

In consideration of the above circumstances, the present invention obtains a webbing take-up device capable of simplifying a strength maintaining structure with respect to load acting when a drive device has been actuated.

In consideration of the above circumstances, the present invention also obtains a webbing take-up device capable of reducing the output of a prevention release section.

A webbing take-up device of a first aspect includes: a spool that rotates in a pull-out direction due to a webbing being pulled out; a force limiter member that is capable of actuating according to rotation of the spool in the pull-out direction, and that, in an actuated state, absorbs a part of a rotation force of the spool by being deformed; a support member that supports the force limiter member; a movable member that changes a deformation amount of the force limiter member by being moved; a drive device that is disposed with respect to the movable member on a straight line along a movement direction of the movable member, and that moves the movable member by a drive force that is output toward a movable member side; and a single retaining member that retains the drive device, that retains the movable member so as to allow movement, and that transmits the drive force that is output from the drive device toward the movable member.

In the webbing take-up device of the first aspect, the drive device is retained by the single (one-piece) retaining member, the movable member is retained so as to be capable of moving, and drive force output from the drive device is transmitted to the movable member. This enables load when the drive device is actuated to be supported by the single retaining member, enabling the strength maintaining structure to be simplified.

The drive device is disposed with respect to the movable member in a straight line along the movement direction of the movable member, and the drive device outputs drive force toward the movable member side. This enables the drive force output from the drive device to be efficiently imparted to the movable member, and enables the influence of the drive force output from the drive device on the retaining member to be reduced.

A webbing take-up device of a second aspect is the webbing take-up device of the first aspect, wherein the retaining member prevents movement of the movable member at a movement end point of the movable member.

In the webbing take-up device of the second aspect, movement of the movable member by the drive force of the drive device is prevented by the retaining member. Thus, not only reaction force of the drive force of the drive device, but also load acting when the movement of the movable member has been prevented, is received by the retaining member. This enables the strength maintaining structure to be further simplified.

A webbing take-up device of a third aspect is the webbing take-up device of the second aspect, wherein the retaining member is directly abutted by the movable member in a state in which movement of the movable member has been prevented.

In the webbing take-up device of the third aspect, the retaining member is directly abutted by the movable member in the state in which movement of the movable member has been prevented, thereby enabling precision of the movement stroke of the movable member to be increased.

A webbing take-up device of a fourth aspect is the webbing take-up device of the third aspect, wherein: the movable member is formed in a columnar shape with an axial direction thereof along the movement direction; and an end portion of the movable member, which is at a movement direction side of the movable member, abuts the retaining member in the state in which movement has been prevented.

In the webbing take-up device of the fourth aspect, the movement direction side end portion of the movable member abuts the retaining member in the state in which movement of the movable member has been prevented. Note that forming the movable member in a column shape with its axial direction along the movement direction enables the movable member to have a high strength with respect to load which the movable member receives from the retaining member when the movable member has abutted the retaining member.

A webbing take-up device of a fifth aspect is the webbing take-up device of any one of the first aspect to the fourth aspect, further including: a deformation amount changing member that is provided so as to be able to deform the force limiter member, and that changes a deformation amount of the force limiter member by being displaced; and a displacement prevention member that prevents displacement of the deformation amount changing member, and that releases prevention of displacement of the deformation amount changing member by being pressed and moved by the end portion of the movable member at the movement direction side.

In the webbing take-up device of the fifth aspect, when the movable member is moved by drive force output from the drive device, the displacement prevention member is pressed by the movable member and is moved. The prevention of displacement of the deformation amount changing member by the displacement prevention member is released, and the deformation amount of the force limiter member is changed due to the displacement prevention member being moved in this manner. Note that the displacement prevention member is moved due to the displacement prevention member being pressed by the movement direction side end portion of the movable member. This enables a portion of the movable member, that presses the displacement prevention member, to have a simple shape, thereby enabling the shape of the movable member itself to be simplified.

A webbing take-up device of a sixth aspect is the webbing take-up device of the fifth aspect, wherein the displacement prevention member is separated from the movable member in a state in which the movable member has reached the movement end point.

In the webbing take-up device of the sixth aspect, the displacement prevention member is separated from the movable member in the state in which the movable member has reached the movement end point thereof, thereby enabling transmission of load from the movable member to the displacement prevention member in the state in which the movable member has reached the movement end point to be blocked or suppressed.

As explained above, the webbing take-up device according to the above first to sixth aspects enables the strength maintaining structure with respect to load acting when the drive device has been actuated to be simplified.

A webbing take-up device of a seventh aspect includes: a spool that rotates in a pull-out direction due to a webbing being pulled out; a force limiter member that is capable of actuating according to rotation of the spool in the pull-out direction, and that, in an actuated state, absorbs a part of a rotation force of the spool by being deformed; a deformation amount changing member that is provided so as to be able to deform the force limiter member, that changes a deformation amount of the force limiter member by being displaced in a deformation amount changing direction, and that is capable of being displaced in the deformation amount changing direction by a load from the force limiter member in the actuated state; and a prevention release section that prevents displacement of the deformation amount changing member in the deformation amount changing direction, and that releases prevention of displacement of the deformation amount changing member by being actuated.

In the webbing take-up device of the seventh aspect, when the prevention release section is actuated and the displacement prevention of the deformation amount changing member by the prevention release section is released, the deformation amount changing member can be displaced in the deformation amount changing direction by load from the force limiter member. The deformation amount of the force limiter member is thereby changed. Since the deformation amount changing member can be displaced in the deformation amount changing direction by the load from the force limiter member in this manner, there is no need for the prevention release section to displace the deformation amount changing member, thereby enabling power output of the prevention release section during actuation to be reduced.

A webbing take-up device of an eighth aspect is the webbing take-up device of the seventh aspect, wherein a direction of the load from the force limiter member in the actuated state toward the deformation amount changing member is toward a deformation amount changing direction side.

In the webbing take-up device of the eighth aspect, the direction of load from the force limiter member in the actuated state to the deformation amount changing member is toward the deformation amount changing direction side. This enables the deformation amount changing member to be displaced in the deformation amount changing direction due to receiving load from the force limiter member in the actuated state.

A webbing take-up device of a ninth aspect is the webbing take-up device of the seventh aspect or the eighth aspect, wherein: displacement of the deformation amount changing member in the deformation amount changing direction is caused by the deformation amount changing member being rotated; and a center position of rotation of the deformation amount changing member is set such that a direction of the rotation of the deformation amount changing member is toward a side of the direction of the load from the force limiter member in the actuated state toward the deformation amount changing member.

In the webbing take-up device of the ninth aspect, the center position of the rotating of the deformation amount changing member is set such that the direction of the rotating of the deformation amount changing member is toward the side of the direction of load from the force limiter member toward the deformation amount changing member. This enables the deformation amount changing member to be rotated due to receiving load from the actuated force limiter member.

A webbing take-up device of a tenth aspect is the webbing take-up device of any one of the seventh aspect to the ninth aspect, further including: a prevention member that configures (is a component of) the prevention release section, that is abutted by the deformation amount changing member so as to prevent displacement of the deformation amount changing member in the deformation amount changing direction, and that releases prevention of displacement of the deformation amount changing member in the deformation amount changing direction by being rotated, wherein a load from the deformation amount changing member toward a side of a center of rotation of the prevention member is input to the prevention member due to a load that displaces the deformation amount changing member in the deformation amount changing direction being imparted to the deformation amount changing member; and a prevention member support section that supports the prevention member so as to allow rotating of the prevention member, from an opposite side of the center of rotation of the prevention member from an abutting portion of the prevention member, at which the prevention member abuts the deformation amount changing member.

In the webbing take-up device of the tenth aspect, when force displacing the deformation amount changing member is imparted to the deformation amount changing member, the prevention member of the prevention release section receives load from the deformation amount changing member toward the rotating center side of the prevention member. Note that the prevention member is supported by the prevention member support section so as to allow rotating from the opposite side of the rotating center of the prevention member from the abutting portion of the prevention member that abuts the deformation amount changing member. This enables load from the deformation amount changing member input to the prevention member to be supported by the prevention member support section, and thereby enables the prevention member to be set with a lower mechanical strength.

As explained above, the webbing take-up device according to the above seventh to tenth aspects enables the power output of the prevention release section to be reduced.

BRIEF DESCRIPTION OF THE DRAWINGS

Embodiments of the invention will be described in detail with reference to the following figures, wherein.

DETAILED DESCRIPTION

Explanation follows regarding a first exemplary embodiment, based on FIGS. 1 to 7. Note that in each of the drawings, the arrow FR indicates the front side of a vehicle applied with a webbing take-up device 10, the arrow OUT indicates the vehicle width direction outside, and the arrow UP indicates the vehicle upper side.

Configuration of Present Exemplary Embodiment

Figure 1:
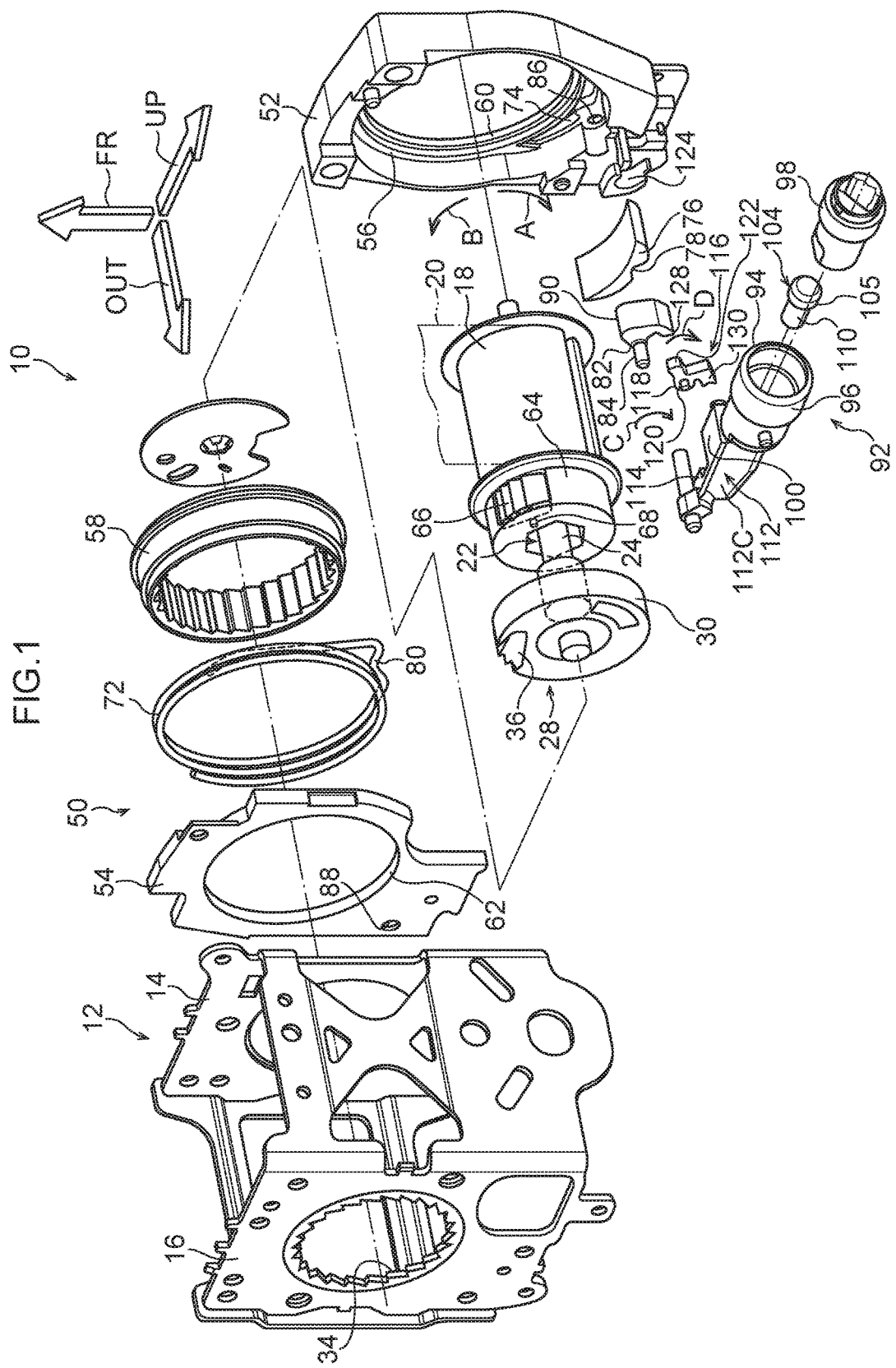
FIG. 1 is an exploded perspective view illustrating relevant portions of a webbing take-up device according to a first exemplary embodiment of the present invention.

As illustrated in FIG. 1, the webbing take-up device 10 includes a frame 12. The frame 12 is fixed to the vehicle body at the vehicle rear side of a rear seat (neither of which are illustrated in the drawings) of the vehicle applied with the webbing take-up device 10. The frame 12 includes a pair of leg plates 14 and 16, and the leg plates 14 and 16 face each other in the vehicle width direction. A spool 18 is provided between the leg plate 14 and the leg plate 16 of the frame 12. The spool 18 is formed in a substantially circular tube shape. The spool 18 has its central axial line direction running along the vehicle width direction, and the spool 18 is capable of rotating about its central axial line. A length direction base end portion of an elongated belt shaped webbing 20 is anchored to the spool 18, and the webbing 20 is taken up onto an outer circumferential portion of the spool 18.

The webbing 20 is pulled out from the spool 18 toward the vehicle front side. The webbing 20 that has been pulled out from the spool 18 passes over the vehicle upper side of a seatback of the rear seat, extends toward the vehicle lower side along the seatback, and passes between the seatback and a seat cushion (neither of which are illustrated in the drawings) of the rear seat, at the vehicle width direction outside of a seating position of an occupant in the rear seat. An anchor plate (not illustrated in the drawings) is provided at the vehicle lower side of the seat cushion of the rear seat. The anchor plate is fixed to the vehicle body at a floor section of the vehicle, for example, and a length direction leading end portion of the webbing 20 is anchored to the anchor plate.

A vehicle seatbelt device applied with the webbing take-up device 10 includes a tongue and a buckle device (neither of which are illustrated in the drawings). The tongue is provided to the webbing 20 at the vehicle front side of the seatback of the rear seat, and the tongue is capable of moving along the webbing 20. The buckle device is provided at the vehicle width direction inside of the seating position in the rear seat. The webbing 20 is fitted to the body of the occupant by engaging the tongue with the buckle device in a state in which the webbing 20 has been wrapped across the body of the occupant seated in the rear seat.

A spool urging device such as a spiral spring is provided at the vehicle width direction inside of the frame 12. The spool 18 is directly or indirectly coupled to the spool urging device, and the spool 18 is urged in a take-up direction (the arrow A direction in FIG. 1 and FIG. 8 and so on), this being the rotation direction when the webbing 20 is taken up using the spool urging device. A pre-tensioner (not illustrated in the drawings) is also provided at the vehicle width direction inside of the frame 12. The pre-tensioner is actuated during a vehicle emergency such as during a vehicle collision. The spool 18 is rotated in the take-up direction by actuating the pre-tensioner, and the webbing 20 is thereby taken up from the length direction base end side onto the spool 18.

Figure 2:
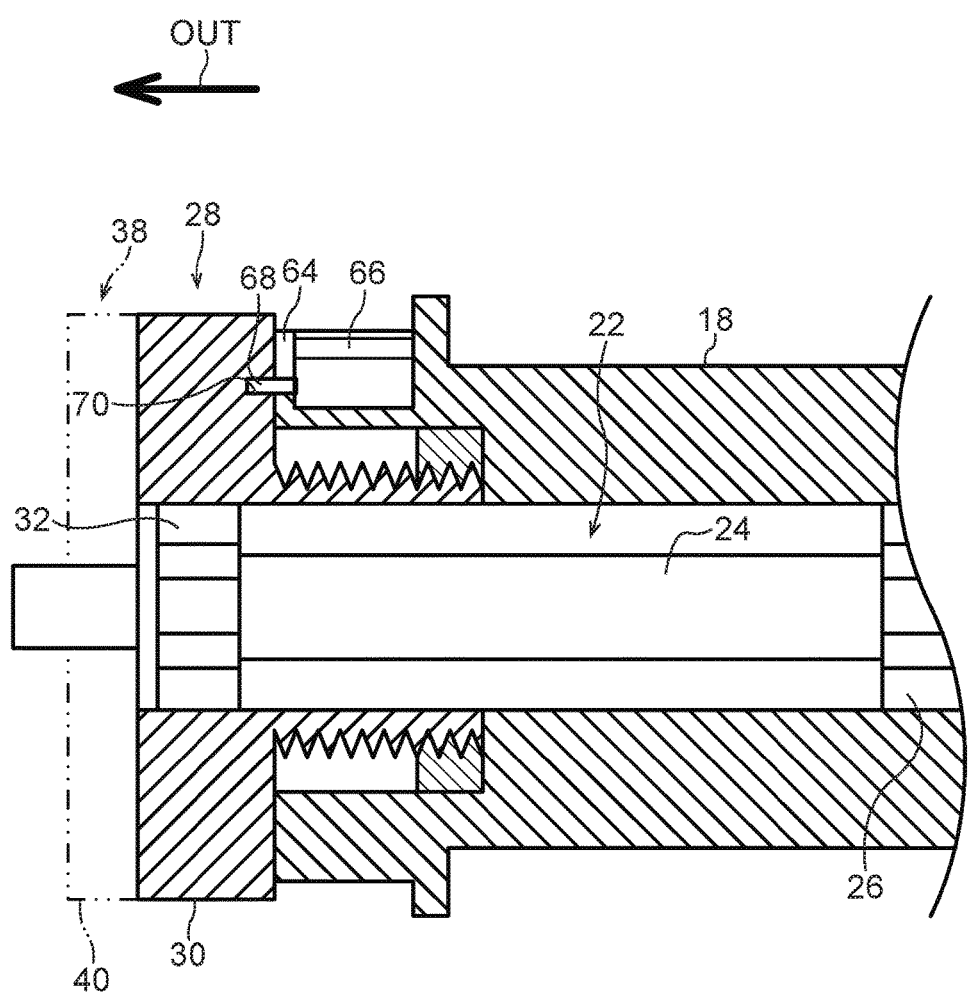
FIG. 2 is a cross-section of a spool and a lock base sectioned along their central axial line.

As illustrated in FIGS. 1 and 2, a torsion bar 22, serving as a rotation force absorption member, is provided inside the spool 18. The torsion bar 22 includes a shaft section 24, serving as a rotation force absorption section. The shaft section 24 has a long rod shape running along the vehicle width direction. As illustrated in FIG. 2, a spool-side coupling section 26 is formed at a vehicle width direction inside end portion of the shaft section 24. The spool-side coupling section 26 is coupled to the spool 18 in a state in which the spool-side coupling section 26 has been prevented from rotating inside the spool 18 relative to the spool 18.

As illustrated in FIGS. 1 and 2, a lock base 30, serving as a rotation locking body configuring a lock mechanism 28 serving as a lock device, is provided at the vehicle width direction outside of the spool 18. As illustrated in FIG. 2, a lock base-side coupling section 32, corresponding to the lock base 30, is formed at a vehicle width direction outside end portion of the shaft section 24 of the torsion bar 22. The lock base-side coupling section 32 is coupled to the lock base 30 in a state in which the lock base-side coupling section 32 has been prevented from rotating relative to the lock base 30.

The lock base 30 is disposed inside a ratchet hole 34 formed to the leg plate 16 of the frame 12 illustrated in FIG. 1. As illustrated in FIGS. 1 and 2, a lock pawl 36 serving as a lock member is provided to the lock base 30. The lock pawl 36 is formed with ratchet teeth that are capable of meshing with ratchet teeth of the ratchet hole 34 of the leg plate 16 of the frame 12. The ratchet teeth of the lock pawl 36 mesh with the ratchet teeth of the ratchet hole 34 when the lock pawl 36 is moved near to the ratchet teeth of the ratchet hole 34. The lock base 30 is thereby prevented from rotating in a pull-out direction (the arrow B direction in FIG. 1 and FIG. 8 and so on), this being the opposite direction to the take-up direction.

As illustrated in FIG. 2, a V gear 40, serving as a rotation following body configuring a sensor mechanism 38, is provided at the vehicle width direction outside of the lock base 30. The V gear 40 is capable of rotating so as to follow the lock base 30, although the lock base 30 is capable of rotating in the pull-out direction relative to the V gear 40 in a state in which rotation of the V gear 40 in the pull-out direction has been prevented. The lock pawl 36 of the lock base 30 is engaged by the V gear 40, and the lock pawl 36 is moved near to the ratchet teeth of the ratchet hole 34 of the leg plate 16 of the frame 12 interlocking with the lock base 30 rotating in the pull-out direction relative to the V gear 40.

The sensor mechanism 38 is configured by, for example, a "VSIR mechanism" that is actuated by vehicle acceleration during a vehicle emergency such as during a vehicle collision, or a "WSIR mechanism" that is actuated in cases in which rotational acceleration of the V gear 40 in the pull-out direction has exceeded a specific speed. Rotation of the V gear 40 in the pull-out direction is prevented by actuating the sensor mechanism 38.

As illustrated in FIG. 1, the webbing take-up device 10 includes a selectable force limiter mechanism 50. Note that in the below description, "selectable force limiter" is abbreviated to "SFL". The SFL mechanism 50 includes SFL housing 52, serving as a base member. An SFL sheet 54, serving as a cover member, is provided at the vehicle width direction outside of the SFL housing 52. The SFL housing 52 and the SFL sheet 54 are each formed in a plate shape, and the thickness direction of the SFL housing 52 and the thickness direction of the SFL sheet 54 both run along the vehicle width direction. The SFL housing 52 and the SFL sheet 54 are provided at the leg plate 16 side between the leg plate 14 and the leg plate 16 of the frame 12, and the SFL housing 52 and the SFL sheet 54 are fixed to the leg plate 16 of the frame 12 by fasteners such as screws.

A base ring accommodating section 56 is formed in the SFL housing 52. The base ring accommodating section 56 is a hole section open at a vehicle width direction outside face of the SFL housing 52. A base ring 58, serving as an SFL rotating body (a support member), is provided inside the base ring accommodating section 56. A cross-section profile of an outside face of the base ring 58 is formed in a circular ring shape, and the base ring 58 is provided coaxially to the spool 18. A vehicle width direction inside end portion of the base ring 58 is rotatably supported by a housing-side shaft receiving hole 60 formed in the SFL housing 52, and a vehicle width direction outside end portion of the base ring 58 is rotatably supported by a sheet-side shaft receiving hole 62 formed in the SFL sheet 54.

A pawl accommodating section 64 formed at a vehicle width direction outside end portion of the spool 18 is disposed inside the base ring 58. An SFL pawl 66, serving as an SFL coupling member, is provided to the pawl accommodating section 64. As illustrated in FIG. 2, a shear pin 68 is formed on the SFL pawl 66. The shear pin 68 enters a guide hole 70 formed in the lock base 30 of the lock mechanism 28. When the spool 18 is rotated in the pull-out direction relative to the lock base 30, the shear pin 68 of the SFL pawl 66 is guided in the guide hole 70 of the lock base 30, and the SFL pawl 66 is thereby moved in a direction nearing the base ring 58.

Ratchet teeth are formed on an inside face of the base ring 58, and ratchet teeth that are capable of meshing with the ratchet teeth of the base ring 58 are formed on the SFL pawl 66. When the ratchet teeth of the SFL pawl 66 mesh with the ratchet teeth of the base ring 58 due to the SFL pawl 66 nearing the base ring 58, the base ring 58 is rotated in the pull-out direction together with the spool 18, and the shear pin 68 of the SFL pawl 66 is broken.

Figure 6:
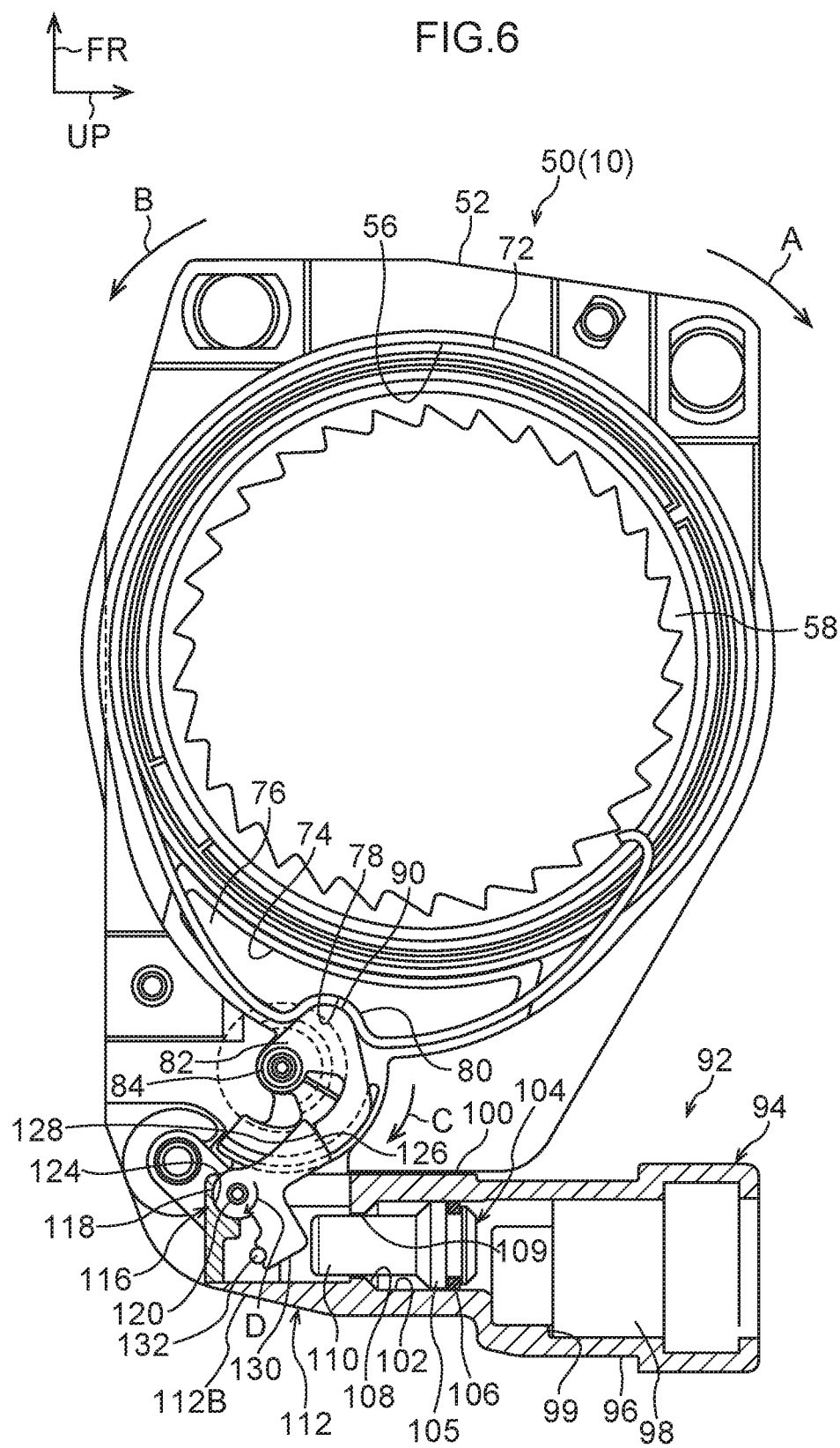
FIG. 6 is a side view illustrating an initial state of a drive device, an SFL lever, and a switching pawl from the vehicle width direction outside.

A wire 72, configuring an energy absorption member serving as an elongated energy absorption member (a force limiter member), is provided to the base ring 58. As illustrated in FIGS. 1 and 6, the wire 72 is formed in a spiral shape by an elongated metal wire material. A length direction leading end side of the wire 72 is oriented toward the pull-out direction side with respect to a length direction base end side of the wire 72, and the length direction leading end side of the wire 72 is displaced toward the vehicle width direction inside with respect to the length direction base end side of the wire 72. The spiral shaped wire 72 is provided at the radial direction outside of the base ring 58.

The wire 72 press-contacts an inside face of the base ring accommodating section 56 of the SFL housing 52 under the elastic force of the wire 72, and the wire 72 is thereby retained by the SFL housing 52 in an initial state. A length direction leading end portion of the wire 72 passes through the radial direction outside or radial direction inside of a spiral shaped portion which is further toward the length direction base end side than the length direction leading end portion of the wire 72, and is displaced toward the vehicle width direction outside, and is anchored to a wire anchor portion (not illustrated in the drawings) formed in the base ring 58. The wire 72 thereby rotates together with the base ring 58.

A piece insertion hole 74 is formed inside the base ring accommodating section 56 of the SFL housing 52 at the vehicle rear side of the base ring 58. A piece 76 is inserted into the piece insertion hole 74 from the vehicle width direction outside. A vehicle width direction outside portion of the piece 76 that has been inserted into the piece insertion hole 74 projects out further toward the vehicle width direction outside than the piece insertion hole 74. A first wound portion at the length direction leading end side of the wire 72 passes over the vehicle rear side of the piece 76, and the wire 72 that is further toward the length direction base end side than the first wound portion, at the length direction leading end side of the wire 72, passes over the vehicle front side of the piece 76.

A recessed portion 78 is formed in a vehicle up-down direction intermediate portion of a vehicle rear side face of the piece 76. A bent portion 80 that is bent so as to trace the recessed portion 78 of the piece 76 is formed in the first wound portion at the length direction leading end side of the wire 72. The bent portion 80 of the wire 72 enters into the recessed portion 78 of the piece 76.

An SFL lever 82, serving as a deformation amount changing member, is provided to the SFL housing 52. A pair of lever support shafts 84 (only the lever support shaft 84 at the vehicle width direction outside is illustrated in FIGS. 1 and 6) are respectively formed on vehicle width direction side faces of the SFL lever 82 respectively. The lever support shaft 84 (not illustrated in the drawings) at the vehicle width direction inside of the SFL lever 82 is inserted into a housing-side shaft receiving hole 86 formed in the SFL housing 52, and the lever support shaft 84 at the vehicle width direction outside of the SFL lever 82 is inserted into a sheet-side shaft receiving hole 88 formed in the SFL sheet 54. The SFL lever 82 is thereby capable of rotating about the lever support shafts 84.

A lever engagement portion 90 is formed at the SFL lever 82. In an initial state of the SFL lever 82 illustrated in FIG. 6, the lever engagement portion 90 abuts the bent portion 80 of the wire 72 from the opposite side of the wire 72 to the recessed portion 78 of the piece 76. Thus, when the wire 72 is rotated in the pull-out direction together with the base ring 58 in this state, the wire 72 that is further toward the length direction base end side than the bent portion 80 is pressed and deformed into a wave shape between the respective side portions of the recessed portion 78 of the piece 76 and the lever engagement portion 90 of the SFL lever 82.

As illustrated in FIGS. 1 and 6, a drive device 92 is provided to the SFL housing 52. The drive device 92 includes a base cartridge 94 serving as a retaining member (holding member). The base cartridge 94 is formed by integral molding using zinc die-cast, for example, and the base cartridge 94 is coupled to and retained by the SFL housing 52 and the SFL sheet 54 using a coupling pin or the like.

The base cartridge 94 includes a micro gas generator attachment section 96. Note that in the below description, "micro gas generator" is abbreviated to "MGG". The MGG attachment section 96 is formed overall in a circular tube shape, and the MGG attachment section 96 has its central axial line direction along the vehicle up-down direction. An MGG 98, serving as a drive section, is provided inside the MGG attachment section 96. As illustrated in FIG. 6, an MGG positioning section 99 is formed inside the MGG attachment section 96, and the MGG positioning section 99 abuts the MGG 98 from the vehicle lower side of the MGG 98. The MGG 98 is thereby prevented from moving toward the vehicle lower side inside the MGG attachment section 96. A vehicle upper side end portion of the MGG attachment section 96 is crimped, thereby preventing the MGG 98 from moving toward the vehicle upper side.

A connector (not illustrated in the drawings) is connected to a vehicle upper side portion of the MGG 98, and the MGG 98 is connected by the connector to an ECU, serving as a controller (not illustrated in the drawings). The MGG 98 is actuated when an activation signal output from the ECU is switched from low level to high level, for example, and gas is thereby ejected from a vehicle lower side end portion of the MGG 98.

The ECU is electrically connected to a build detection section, such as a load sensor provided in the seat cushion of the rear seat, or a webbing pull-out length detection sensor that detects the length of the webbing 20 that has been pulled out from the spool 18 of the webbing take-up device 10. The ECU determines whether or not the build of the occupant seated in the seated position in the rear seat is a standard build or greater, based on the build detection signal output from the build detection section.

As illustrated in FIG. 6, a cylinder section 100 is formed at the vehicle lower side of the MGG attachment section 96 at the base cartridge 94. A cylinder hole 102 is formed piercing through the cylinder section 100 in the vehicle up-down direction. A cross-section profile of the cylinder hole 102 cut along a direction orthogonal to the pierced-through direction has a circular shape. The cylinder hole 102 is communicated to the inside of the MGG attachment section 96, and gas ejected from the MGG 98 is supplied into the cylinder hole 102.

A piston 104, serving as a movable member (moving member), is provided inside the cylinder hole 102 of the cylinder section 100 of the base cartridge 94. The piston 104 is disposed facing the MGG 98 in line at the vehicle lower side of the MGG 98. The piston 104 includes a piston main body 105. The piston main body 105 has a circular shape as viewed along the vehicle up-down direction, and an outer diameter dimension of a maximum outer diameter portion of the piston main body 105 is set slightly smaller than an inner diameter dimension of the cylinder hole 102 of the cylinder section 100. The piston main body 105 is capable of moving along the vehicle up-down direction inside the cylinder hole 102 of the cylinder section 100.

A ring shaped sealing member 106 is attached to the piston main body 105. The sealing member 106 is formed of a synthetic resin material that has substantially the same elasticity as rubber material, and seals between the piston main body 105 and an inside face of the cylinder hole 102 of the cylinder section 100. A pressing section 110 is formed on a vehicle lower side face of the piston main body 105. The pressing section 110 is formed in a circular column shape, and a central axial line of the pressing section 110 is set coaxially to a central axial line of the piston main body 105, such that the piston 104 is formed overall in a column shape.

A flange portion 108 is formed at a vehicle lower side end portion of the cylinder section 100 of the base cartridge 94. A circular hole 109 is formed coaxially to the piston main body 105 of the piston 104 at the flange portion 108. A diameter dimension of the circular hole 109 is larger than a diameter dimension of the pressing section 110 of the piston 104, but smaller than a diameter dimension of the piston main body 105 of the piston 104. The pressing section 110 of the piston 104 pierces through the circular hole 109 at the flange portion 108 of the cylinder section 100 and projects out toward the vehicle lower side of the cylinder section 100 of the base cartridge 94.

An extension section 112 extends out toward the vehicle lower side from the vehicle lower side end portion of the cylinder section 100 of the base cartridge 94. The extension section 112 is formed in a plate shape, and the extension section 112 is bent substantially at a right angle at a bent portion 112A at a width direction intermediate portion thereof. The bent portion 112A is set at the vehicle lower side of an end portion at the vehicle lower side and vehicle width direction outside of the cylinder section 100 of the base cartridge 94. A rear plate portion 112B is configured further toward one width direction side of the extension section 112 than the bent portion 112A.

The rear plate portion 112B has its thickness direction running along the vehicle front-rear direction, and is provided running along a vehicle rear end portion at the vehicle lower side end portion of the cylinder section 100 of the base cartridge 94. An outer panel portion 112C is configured further toward another width direction side than the bent portion 112A of the extension section 112. The outer panel portion 112C has its thickness direction running along the vehicle width direction, and is provided running along a vehicle width direction outside end portion at the vehicle lower side end portion of the cylinder section 100 of the base cartridge 94.

A piston stopper section 114 is formed at the extension section 112. The piston stopper section 114 is formed further toward the vehicle lower side than the vehicle lower side end portion of the cylinder section 100 of the base cartridge 94, and is formed at the vehicle front side of the rear plate portion 112B of the extension section 112, and at the vehicle width direction inside of the outer panel portion 112C of the extension section 112.

As illustrated in FIG. 1, FIGS. 3A, 3B, and FIGS. 4A and 4B, the piston stopper section 114 is formed in a substantially rectangular block shape. A vehicle upper side face of the piston stopper section 114 faces a portion of a vehicle lower side end portion of the pressing section 110 of the piston 104, 110 that is further toward the vehicle width direction outside than the vehicle width direction center (see FIG. 5). The vehicle lower side end portion of the pressing section 110 is capable of abutting the vehicle upper side face of the piston stopper section 114. The central axial line direction length and the like of the pressing section 110 of the piston 104 is set such that the piston main body 105 of the piston 104 is positioned further toward the vehicle upper side than the flange portion 108 of the cylinder section 100 of the base cartridge 94 in a state in which the vehicle lower side end portion of the pressing section 110 of the piston 104 has abutted the vehicle upper side face of the piston stopper section 114. Thus, load from the piston 104 that has been moved toward the vehicle lower side is input to the piston stopper section 114, and is not input to the flange portion 108 of the cylinder section 100.

Figure 3A:
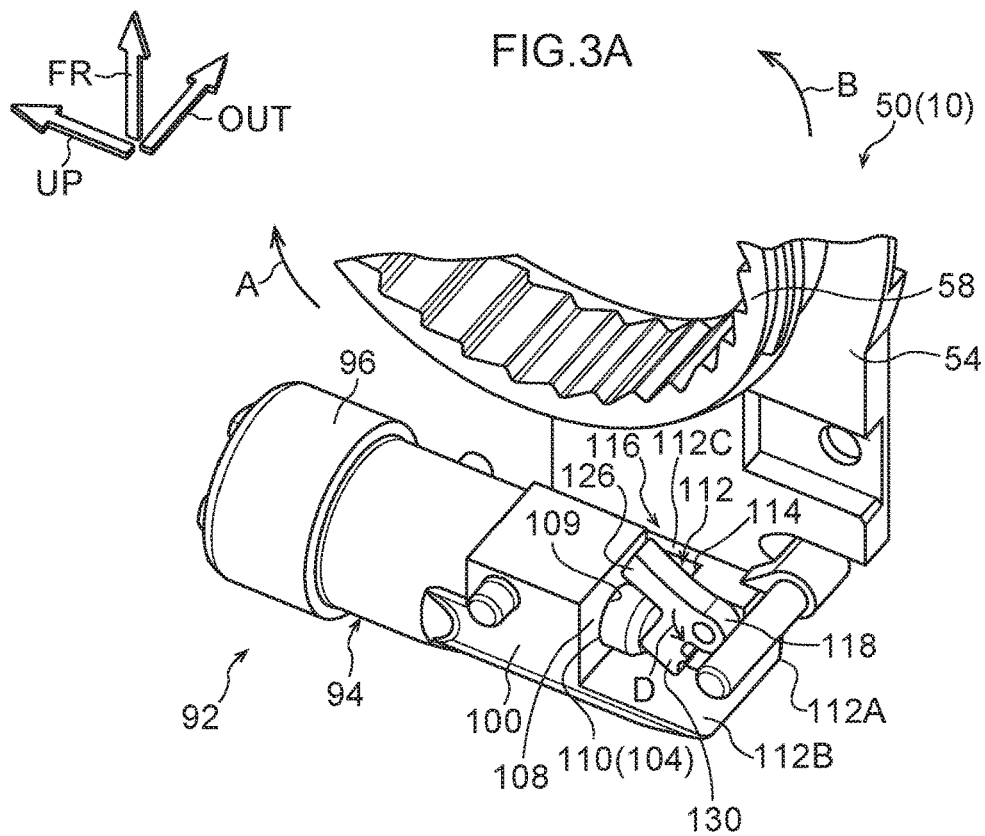
FIG. 3A is an enlarged perspective view of a base cartridge and portions in close proximity thereto.
Figure 3B:
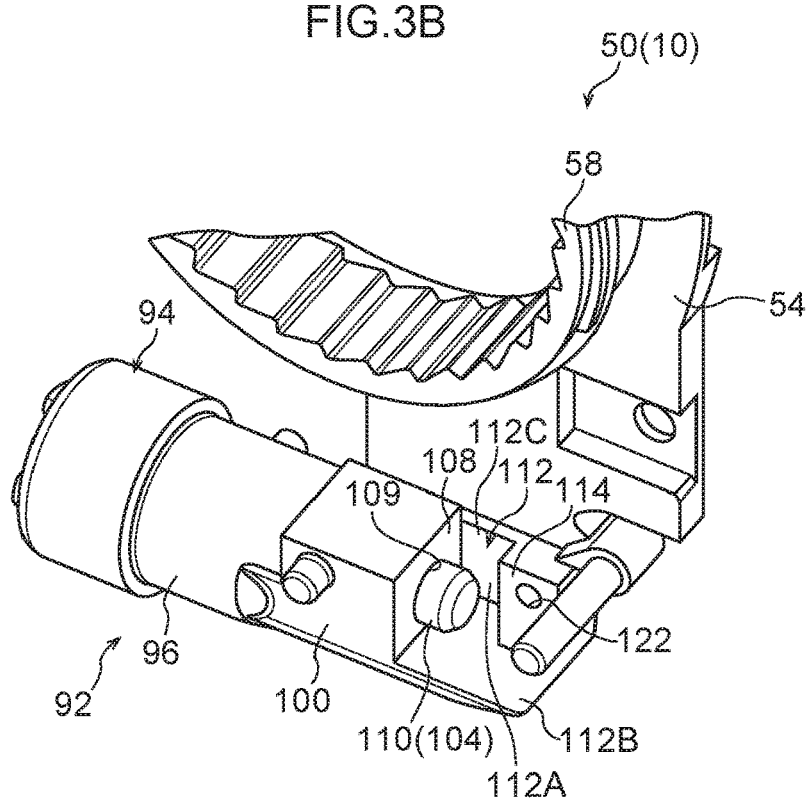
FIG. 3B is a perspective view of FIG. 3A excluding a switching pawl.
Figure 4A:
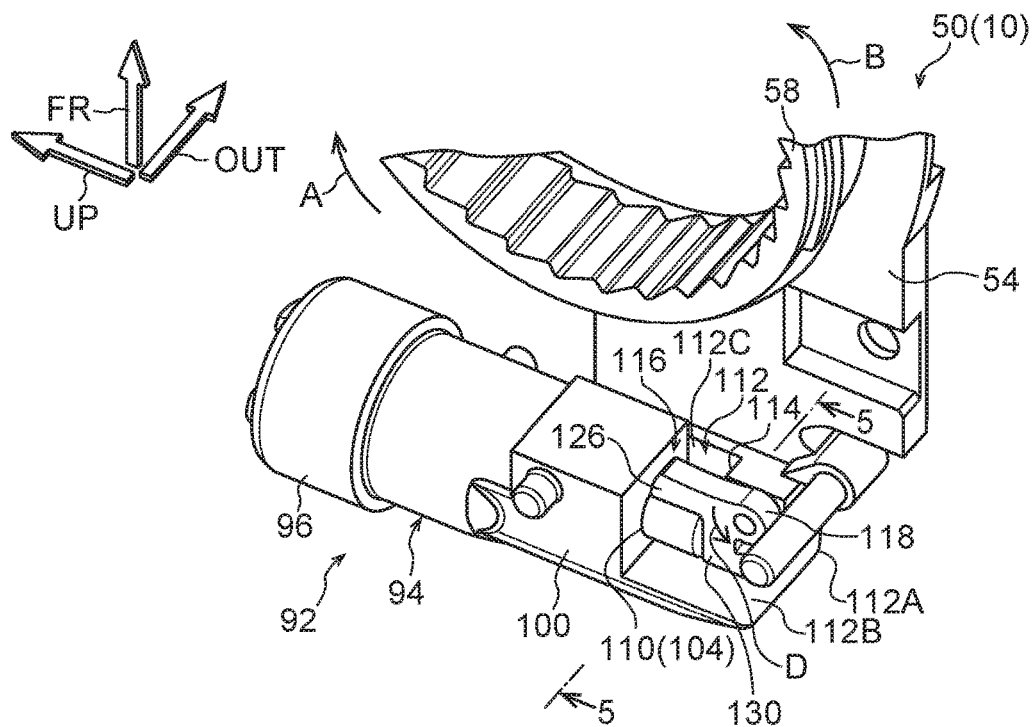
FIG. 4A is a perspective view corresponding to FIG. 3A, illustrating a state in which a pressing section of a piston has been abutted by a piston stopper section of a base cartridge.

As illustrated in FIGS. 3A and 4A, a switching pawl 116, serving as a displacement prevention member, is provided at the vehicle width direction inside of the piston stopper section 114 of the base cartridge 94. The switching pawl 116 includes a base section 118. The base section 118 has a substantially circular plate shape, and the base section 118 has its thickness direction along the vehicle width direction. A pawl support shaft 120 is formed on a vehicle width direction outside face of the base section 118 of the switching pawl 116. The pawl support shaft 120 is formed in the center of the vehicle width direction outside face of the base section 118, and is inserted into a pawl shaft receiving hole 122 (see FIGS. 3B and 4B) formed in the piston stopper section 114. The switching pawl 116 is thereby supported by the piston stopper section 114 of the base cartridge 94 so as to be capable of rotating about the pawl support shaft 120.

As illustrated in FIGS. 1 and 6, a housing-side shaft receiving section 124, corresponding to the base section 118 of the switching pawl 116, is formed in the SFL housing 52. The housing-side shaft receiving section 124 has a curved face that is abutted by an outside face of the base section 118 of the switching pawl 116, and the curved face of the housing-side shaft receiving section 124 abuts a part of the outside face of the base section 118 of the switching pawl 116. The switching pawl 116 is thereby also supported by the housing-side shaft receiving section 124 of the SFL housing 52 so as to be capable of rotating about the pawl support shaft 120.

As illustrated in FIG. 6, a lever stopper tab 126 is formed at the base section 118 of the switching pawl 116. The lever stopper tab 126 extends out from the base section 118 toward the radial direction outside of the base section 118 of the switching pawl 116. In an initial state of the SFL lever 82 and the switching pawl 116, a leading end portion of the lever stopper tab 126 of the switching pawl 116 abuts a lever abutting portion 128 of the SFL lever 82. Thereby, in the initial state of the SFL lever 82 and the switching pawl 116, rotating of the SFL lever 82 is prevented in an engagement release direction (the arrow C direction in FIG. 6 and so on) in which (when) the lever engagement portion 90 of the SFL lever 82 is separated from the bent portion 80 of the wire 72.

A load receiving tab 130 is also formed at the base section 118 of the switching pawl 116. The load receiving tab 130 extends out toward the radial direction outside of the base section 118 of the switching pawl 116 from the base section 118, the extension direction of the load receiving tab 130 from the base section 118 and the extension direction of the lever stopper tab 126 from the base section 118 forming a right angle (the load receiving tab 130 extends out in the extension direction different from the extension direction of that of the lever stopper tab 126). A leading end side of the load receiving tab 130 faces a portion of the vehicle lower side end portion of the pressing section 110 of the piston 104, that is further toward the vehicle width direction inside than the vehicle width direction center thereof (see FIG. 5). When the piston 104 is moved toward the vehicle lower side, the load receiving tab 130 of the switching pawl 116 is pressed toward the vehicle lower side by the vehicle lower side end portion of the pressing section 110 of the piston 104.

The switching pawl 116 is thereby rotated in a prevention release direction (the arrow D direction in FIG. 6 and so on), this being one direction about the pawl support shaft 120. Due to the switching pawl 116 being rotated in the prevention release direction in this manner, the leading end portion of the lever stopper tab 126 of the switching pawl 116 and the lever abutting portion 128 of the SFL lever 82 are released from abutting each other. This enables the SFL lever 82 to rotate in the engagement release direction (the arrow C direction in FIG. 6 and so on), enabling the lever engagement portion 90 of the SFL lever 82 to separate from the bent portion 80 of the wire 72.

Note that the load receiving tab 130 of the switching pawl 116 is configured so as to be capable of rotating slightly toward the vehicle lower side in a state in which the vehicle lower side end portion of the pressing section 110 of the piston 104 has abutted the vehicle upper side face of the piston stopper section 114. Thus, load is prevented or suppressed from being input from the vehicle lower side end portion of the pressing section 110 of the piston 104 to the load receiving tab 130 of the switching pawl 116 in the state in which the vehicle lower side end portion of the pressing section 110 of the piston 104 has abutted the vehicle upper side face of the piston stopper section 114.

Figure 7:
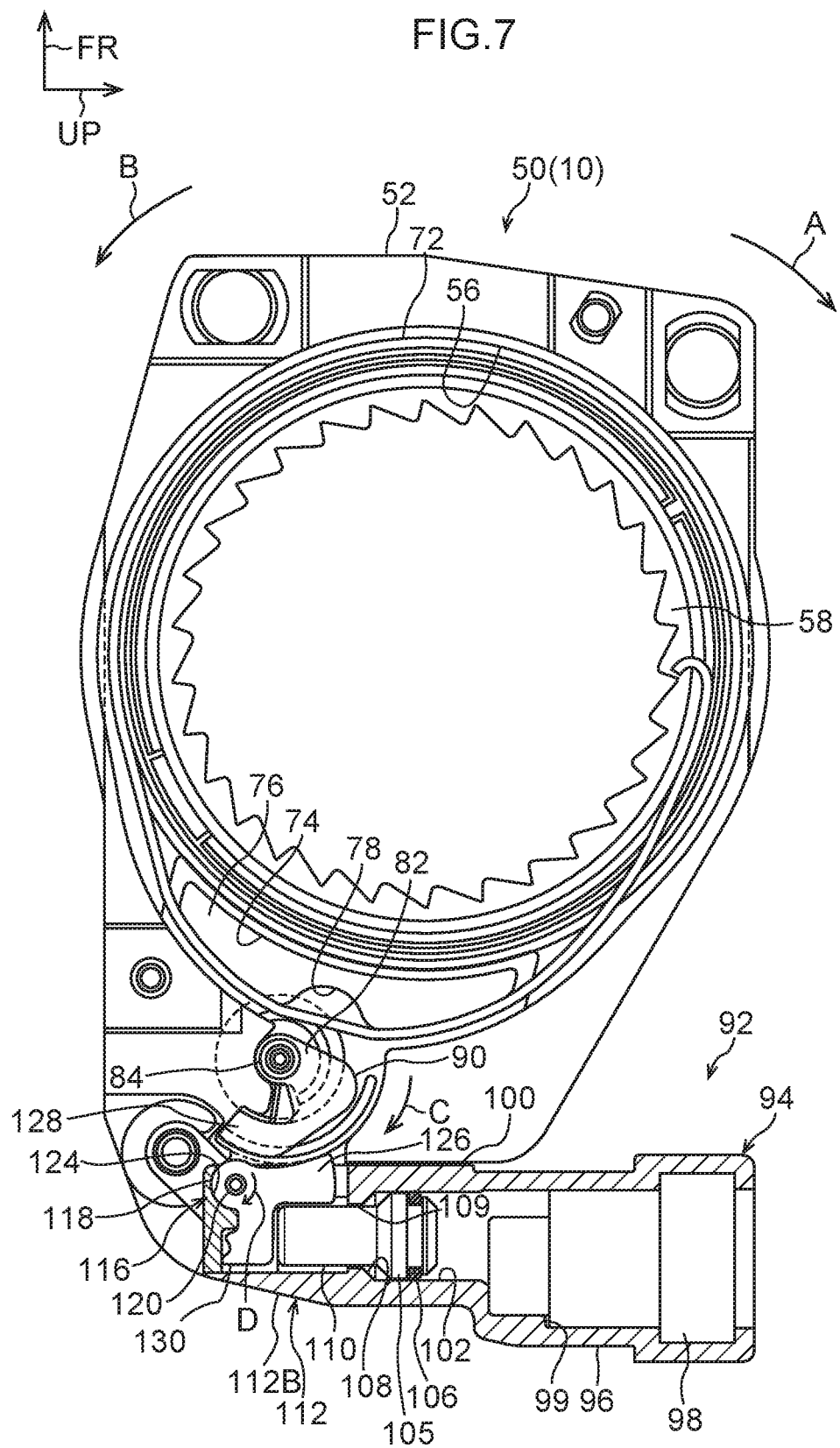
FIG. 7 is a cross-section corresponding to FIG. 6, illustrating a state in which an SFL lever has been rotated in an engagement release direction.

In a state in which the load receiving tab 130 of the switching pawl 116 has been pressed by the vehicle lower side end portion of the pressing section 110 of the piston 104 so as to became a state in which the vehicle lower side end portion of the pressing section 110 of the piston 104 abuts the vehicle upper side face of the piston stopper section 114, the lever stopper tab 126 of the switching pawl 116 is disposed at the vehicle front side of the pressing section 110 of the piston 104 so as to be alongside the pressing section 110 (FIG. 7). In this state, the lever stopper tab 126 of the switching pawl 116 is disposed further toward the vehicle rear side than a vehicle front side face of the cylinder section 100 of the base cartridge 94.

As illustrated in FIG. 6, a switching shear pin 132 is provided at the vehicle lower side of the load receiving tab 130 of the switching pawl 116 which is in the initial state. The switching shear pin 132 is formed projecting out from the SFL housing 52. The switching pawl 116 is prevented from rotating in the prevention release direction (the arrow D direction in FIG. 6 and so on) in the initial state due to the switching shear pin 132 abutting the load receiving tab 130 of the switching pawl 116 from the vehicle lower side. The switching pawl 116 is accordingly able to rotate in the prevention release direction when the switching shear pin 132 is broken by receiving load from the load receiving tab 130 of the switching pawl 116.

Operation and Advantageous Effects of Present Exemplary Embodiment

In the webbing take-up device 10, in a state in which the webbing 20 has been pulled out from the spool 18 by the occupant seated in the rear seat of the vehicle and wrapped across the body of the occupant, a state in which the webbing 20 is fitted to the body of the occupant is brought about by engaging the tongue provided to the webbing 20 with the buckle device.

During a vehicle emergency such as during a vehicle collision, at least one sensor mechanism 38 from out of the "VSIR mechanism" or the "WSIR mechanism" is actuated, and the V gear 40 is thereby prevented from rotating in the pull-out direction. When, in this state, the webbing 20 is pulled by the body of the occupant moving under inertia toward the vehicle front side, such that the lock base 30 of the lock mechanism 28 is rotated in the pull-out direction together with the spool 18, the lock base 30 is rotated in the pull-out direction (the arrow B direction in FIG. 1 and so on) relative to the V gear 40.

The lock pawl 36 of the lock base 30 is accordingly moved near to the ratchet teeth of the ratchet hole 34 of the leg plate 16 of the frame 12. When the ratchet teeth of the lock pawl 36 of the lock base 30 accordingly mesh with the ratchet teeth of the ratchet hole 34 of the leg plate 16 of the frame 12, the lock base 30 is prevented from rotating in the pull-out direction, and the spool 18 is also prevented from rotating in the pull-out direction. Thus the webbing 20 is prevented from being pulled out from the spool 18, enabling movement of the body of the occupant toward the vehicle front side to be restricted by the webbing 20.

When the pre-tensioner provided at the vehicle width direction inside of the frame 12 is actuated, the spool 18 is rotated in the take-up direction. Thus, the webbing 20 is taken up onto the spool 18, and the body of the occupant is even more strongly restrained than before by the webbing 20.

When, in the state in which rotation of the spool 18 in the pull-out direction has been prevented by the lock mechanism 28, rotation force in the pull-out direction imparted to the spool 18 from the webbing 20 becomes greater than a rotation load required to twist and deform the shaft section 24 of the torsion bar 22 about its central axial line, the spool-side coupling section 26 of the torsion bar 22 is rotated in the pull-out direction relative to the lock base-side coupling section 32, and the shaft section 24 of the torsion bar 22 is thereby twisted and deformed. Thus, the spool 18 is rotated in the pull-out direction (the arrow B direction in FIG. 1 and so on), and the webbing 20 is pulled out from the spool 18. The body of the occupant can move under inertia toward the vehicle front side by the amount of the pulled-out length of the webbing 20 from the spool 18.

When the spool 18 is rotated in the pull-out direction in the state in which rotation of the lock base 30 in the pull-out direction has been prevented, the shear pin 68 of the SFL pawl 66 provided to the pawl accommodating section 64 of the spool 18 is guided and moved in the guide hole 70 of the lock base 30 of the lock mechanism 28. The SFL pawl 66 is thereby moved in a direction nearing the base ring 58, and the ratchet teeth on the SFL pawl 66 mesh with the ratchet teeth on the inside face of the base ring 58. The base ring 58 is thereby coupled to the spool 18.

In this state, when rotation force in the pull-out direction imparted to the spool 18 from the webbing 20 becomes greater than the sum of a rotation load required to twist and deform the shaft section 24 of the torsion bar 22 about its central axial line, and a rotation load required to press (compress, iron or the like) the wire 72 into a wave shape by both side portions of the recessed portion 78 of the piece 76 and the lever engagement portion 90 of the SFL lever 82 and to deform the wire 72, the spool 18 is further rotated in the pull-out direction (the arrow B direction in FIG. 1 and so on). The webbing 20 is thereby further pulled out from the spool 18. The body of the occupant can further move under inertia toward the vehicle front side by the amount of the pulled-out length of the webbing 20 from the spool 18.

When the base ring 58 is rotated in the pull-out direction together with the spool 18 in the state in which the base ring 58 and the spool 18 have been coupled together by the SFL pawl 66, the length direction leading end portion of the wire 72 is pulled by the base ring 58, and the wire 72 is rotated in the pull-out direction together with the base ring 58. When the wire 72 is rotated in the pull-out direction in this manner, the wire 72 that is further toward the length direction base end side than the bent portion 80 is led toward the vehicle rear side of the piece 76, and is then led between the recessed portion 78 of the piece 76 and the lever engagement portion 90 of the SFL lever 82. The wire 72 that is further toward the length direction base end side than the bent portion 80 is thereby pressed into a wave shape and deformed between both side portions of the recessed portion 78 of the piece 76 and the lever engagement portion 90 of the SFL lever 82, and part of the rotation force in the pull-out direction of the spool 18 is also absorbed by this deformation of the wire 72.

On the other hand, when the ECU determines that the build of the occupant is a standard build or greater based on the build detection signal output from the build detection section, the activation signal output from the ECU during a vehicle emergency switches from low level to high level, and the MGG 98 is thereby actuated. When the MGG 98 is actuated, gas is ejected from the vehicle lower side end portion of the MGG 98 and the gas is supplied into the cylinder hole 102 of the cylinder section 100 of the base cartridge 94.

Figure 4B:
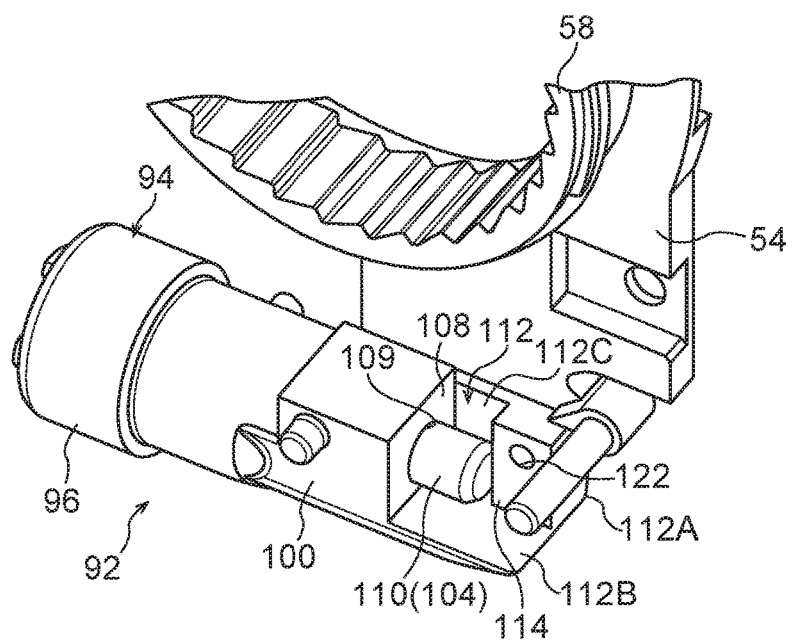
FIG. 4B is a perspective view of FIG. 4A excluding a switching pawl.
Figure 5:
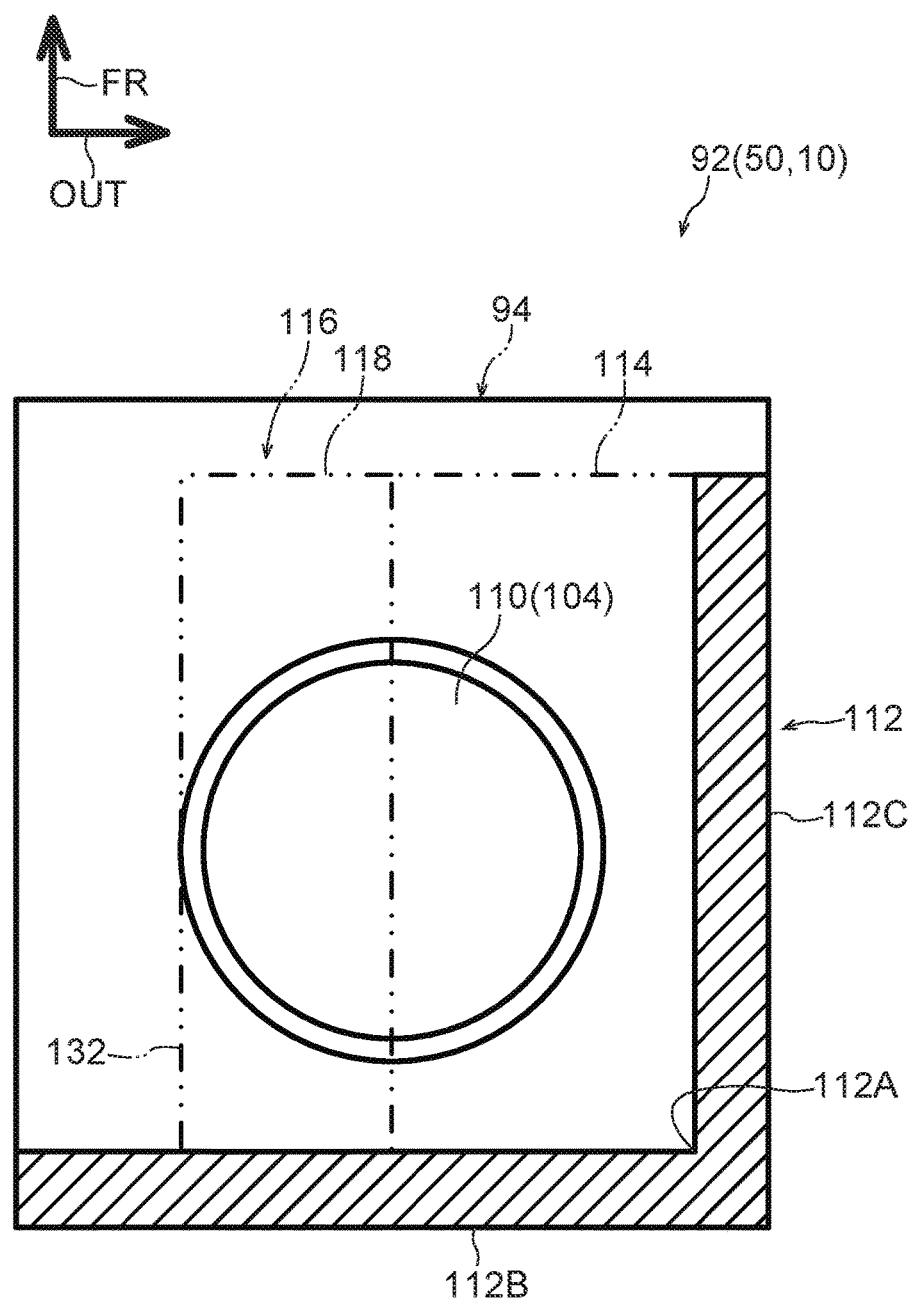
FIG. 5 is a cross-section of a base cartridge sectioned along line 5-5 in FIG. 4A.

When the pressure inside the cylinder hole 102 of the cylinder section 100 rises as a result, the piston main body 105 of the piston 104 inside the cylinder hole 102 is moved toward the vehicle lower side. When the load receiving tab 130 of the switching pawl 116 is accordingly pressed toward the vehicle lower side by the pressing section 110 of the piston 104, the switching shear pin 132 of the SFL housing 52 is broken by the load receiving tab 130 of the switching pawl 116, and, as illustrated in FIGS. 4A, 4B and FIG. 7, the switching pawl 116 receiving load from the pressing section 110 of the piston 104 is rotated in the prevention release direction (the arrow D direction in FIG. 6 and so on).

Thus, as illustrated in FIG. 7, the leading end portion of the lever stopper tab 126 of the switching pawl 116 and the lever abutting portion 128 of the SFL lever 82 are released from abutting each other. When the base ring 58 is rotated in the pull-out direction together with the spool 18 in this state, the lever engagement portion 90 of the SFL lever 82 is pressed in the pull-out direction by the bent portion 80 of the wire 72, and the SFL lever 82 is thereby rotated in the engagement release direction (the arrow C direction in FIG. 7 and so on).

In the state in which the SFL lever 82 has been rotated in the engagement release direction in this manner, the wire 72 is no longer pressed and deformed by the lever engagement portion 90 of the SFL lever 82. Deformation of the wire 72 by the SFL lever 82 and the piece 76 is thereby suppressed in this state. This enables the absorption amount of rotation force in the pull-out direction of the spool 18 by deformation of the wire 72 to be smaller, and enables rotation force required to rotate the spool 18 in the pull-out direction to be less than when the SFL lever 82 is in the initial state.

The base cartridge 94 configured including the MGG attachment section 96, the cylinder section 100, and the piston stopper section 114 is formed as an integral unit (one piece structure) by integral molding, and is not formed by assembling plural components (plural pieces). Thus, reaction force acting on the MGG 98 is received by the MGG attachment section 96 of the base cartridge 94 when the MGG 98, retained by the MGG attachment section 96 at the inside the MGG attachment section 96 of the base cartridge 94, is actuated and gas is ejected from the vehicle lower side end portion of the MGG 98.

When the gas ejected from the vehicle lower side end portion of the MGG 98 is supplied into the cylinder hole 102 of the cylinder section 100 of the base cartridge 94, the pressure of the gas is received by the cylinder section 100 of the base cartridge 94, such that the piston 104 is moved toward the vehicle lower side.

When the piston 104 arrives at a movement end point which is at the vehicle lower side (opposite to the side of the MGG 98), as illustrated in FIG. 4B, the vehicle lower side end portion of the pressing section 110 of the piston 104 abuts the vehicle upper side face of the piston stopper section 114 of the base cartridge 94. The piston 104 is thereby prevented from moving further toward the vehicle lower side than the movement end point. Note the piston stopper section 114 is integrally formed to the base cartridge 94 as part of the base cartridge 94. Thus, load from the piston 104 moved by the pressure of gas generated by the MGG 98 is received by the base cartridge 94.

As described above, the pressure of the gas generated by the MGG 98, the load from the piston 104 moved by the pressure of the gas, and the reaction force acting on the MGG 98 when gas has been ejected from the MGG 98 can all be received by the base cartridge 94. This enables strength maintaining structure with respect to the above-described pressure, load, and reaction force to be simplified.

This enables the coupling strength of the SFL housing 52 and the SFL sheet 54 to the base cartridge 94 to be set low, thereby enabling the SFL housing 52 and the SFL sheet 54 to be configured as separate bodies to the base cartridge 94. This enables the SFL housing 52 and the SFL sheet 54 to be formed of a material such as synthetic resin material that has a lower mechanical strength than the metal material forming the base cartridge 94. This enables the SFL housing 52 and the SFL sheet 54, and therefore the webbing take-up device 10, to be lighter in weight, and also enables costs to be reduced.

The piston 104 is disposed facing the MGG 98 in line at the vehicle lower side of the MGG 98. This enables the pressure of gas ejected from the MGG 98 toward the vehicle lower side to contribute to efficiently moving the piston 104 toward the vehicle lower side. Moreover, the inside face of the cylinder hole 102 of the cylinder section 100 of the base cartridge 94 is orthogonal to the ejection direction of gas from the MGG 98, thereby enabling the influence of gas pressure on the cylinder section 100 of the base cartridge 94 to be smaller.

The piston stopper section 114 of the base cartridge 94 faces the cylinder section 100 at the vehicle lower side of the cylinder section 100 of the base cartridge 94 made of metal. Thus, even if gas leaks from the vehicle lower side end portion of the cylinder section 100, this gas can be received by the piston stopper section 114 of the base cartridge 94 made of metal. This enables durability (fire resistance) with respect to gas that has leaked from the vehicle lower side end portion of the cylinder section 100 to be handled in the base cartridge 94, and enables costs to be reduced in this respect also.

As described above, the piston 104 is prevented from moving toward the vehicle lower side due to the vehicle lower side end portion of the pressing section 110 of the piston 104 abutting the vehicle upper side face of the piston stopper section 114 of the base cartridge 94. This enables the precision of the movement stroke (movement distance) of the piston 104 to be increased compared to a configuration in which the piston 104 abuts a different member to the base cartridge 94 to prevent the piston 104 from moving toward the vehicle lower side.

The vehicle upper side face of the piston stopper section 114 of the base cartridge 94 is directly abutted by the vehicle lower side end portion of the pressing section 110 of the piston 104, without another member being interposed therebetween. Twisting and so on of the pressing section 110 of the piston 104 is therefore less liable to occur when movement of the piston 104 has been prevented. This also enables the precision of the movement stroke (movement distance) of the piston 104 to be increased.

Further, the location (portion) of the piston 104, that abuts the piston stopper section 114 of the base cartridge 94 is configured at the vehicle lower side end portion of the pressing section 110 of the piston 104, and the location (portion) of the piston 104, that presses the load receiving tab 130 of the switching pawl 116 is also configured at the vehicle lower side end portion of the pressing section 110 of the piston 104. It is thereby sufficient for the vehicle lower side end portion of the pressing section 110 of the piston 104 to simply be a planar face. This enables the shape of the pressing section 110 of the piston 104 to be a simple shape such as a circular column shape, enabling costs to be reduced.

The configuration is such that the pressing section 110 of the piston 104 is configured in a circular column shape, and the vehicle lower side end portion of the pressing section 110, this being the central axial line direction end portion of the pressing section 110, abuts the vehicle upper side face of the piston stopper section 114 of the base cartridge 94. Thus, when movement of the piston 104 has been prevented by the piston stopper section 114 of the base cartridge 94, the orientation of load from the piston stopper section 114 received at the piston 104 is along the central axial line direction of the piston 104. This enables the piston 104 to withstand the load received from the piston stopper section 114, even if the piston 104 has a low mechanical strength. This enables the piston 104 to be made more compact and lighter in weight.

This enables the pressure of gas ejected from the MGG 98 (namely, the power output of the MGG 98) to be smaller (reduced), enables the MGG 98 to be made more compact and lighter in weight, and therefore enables the webbing take-up device 10 to be made more compact and lighter in weight.

The overall shape of the piston 104 including the pressing section 110 can be made into a substantially circular column shape, such that, when disposing the piston 104 inside the cylinder hole 102 of the cylinder section 100 of the base cartridge 94, the piston 104 can be disposed inside the cylinder hole 102 of the cylinder section 100 of the base cartridge 94 regardless of the rotation position of the piston 104 about the central axial line. Assembly of the drive device 92 is thereby easier.

In the state in which movement of the piston 104 toward the vehicle lower side has been prevented by the piston stopper section 114 of the base cartridge 94, the load receiving tab 130 of the switching pawl 116 is not interposed (not sandwiched) between the vehicle lower side end portion of the pressing section 110 of the piston 104 and the piston stopper section 114 of the base cartridge 94. Moreover, in the state in which movement of the piston 104 has been prevented by the piston stopper section 114 of the base cartridge 94, the switching pawl 116 is rotated slightly in the prevention release direction and is separated from the vehicle lower side end portion of the pressing section 110 of the piston 104 (see FIG. 7).

Thus, when movement of the piston 104 toward the vehicle lower side has been prevented by the piston stopper section 114 of the base cartridge 94, transmission of load from the pressing section 110 of the piston 104 to the load receiving tab 130 of the switching pawl 116 can be blocked or suppressed. This enables the load receiving tab 130 of the switching pawl 116 to be set with a low mechanical strength, enabling the switching pawl 116 to be made more compact and lighter in weight. Since the switching pawl 116 can be made more compact and lighter in weight in this manner, the power output of the MGG 98 can be reduced, enabling the MGG 98 to also be made more compact.

In a state in which the vehicle lower side end portion of the pressing section 110 of the piston 104 has abutted the vehicle upper side face of the piston stopper section 114 of the base cartridge 94 and movement of the piston 104 has been prevented, the piston main body 105 of the piston 104 does not abut the flange portion 108 of the cylinder section 100 of the base cartridge 94. Thus, the piston main body 105 of the piston 104 does not received load from the flange portion 108 of the cylinder section 100 of the base cartridge 94. This enables sealing performance by the piston main body 105 of the piston 104 and the sealing member 106 provided at the piston main body 105 to be maintained in a state in which the piston 104 has finished moving.

When the load receiving tab 130 of the switching pawl 116 is pressed by the pressing section 110 of the piston 104, the lever stopper tab 126 of the switching pawl 116 is rotated at the vehicle front side of the rear plate portion 112B of the extension section 112 and at the vehicle width direction inside of the outer panel portion 112C of the extension section 112. Thus, when the piston 104 has finished moving, the lever stopper tab 126 of the switching pawl 116 is disposed so as to be alongside the pressing section 110 at the vehicle front side of the pressing section 110 of the piston 104, and a large part of the lever stopper tab 126 of the switching pawl 116 is disposed further toward the vehicle rear side than the vehicle front side face of the cylinder section 100 of the base cartridge 94 in this state.

A large part of the switching pawl 116 is thereby disposed inside a placement range of the base cartridge 94 (between the vehicle front side face and the vehicle rear side face of the cylinder section 100 of the base cartridge 94) in a state which the piston 104 has finished moving (FIG. 7). This enables housing space for the switching pawl 116 which has been rotated in the prevention release direction to be reduced, or enables such housing space to be eliminated. This enables the SFL housing 52 and so on to be made more compact.

Note that the present exemplary embodiment is configured such that the vehicle lower side end portion of the pressing section 110 of the piston 104 abuts the piston stopper section 114 of the base cartridge 94, thereby preventing the piston 104 from moving. However, a configuration may be applied in which an abutting portion, capable of abutting part of the base cartridge 94, is set at a vehicle up-down direction intermediate portion of the pressing section 110 of the piston 104, and the piston 104 is prevented from moving due to the abutting portion of the pressing section 110 abutting part of the base cartridge 94. There is no particular limitation to the portion (location) of the piston 104, that abuts part of the base cartridge 94 to prevent the piston 104 from moving.

The present exemplary embodiment is configured such that the switching pawl 116 is rotated in the prevention release direction (the arrow D direction in FIG. 6 and so on) due to the load receiving tab 130 of the switching pawl 116 being pressed by the pressing section 110 of the piston 104. This rotating of the switching pawl 116 in the prevention release direction may be due to the switching pawl 116 being continually pressed by the pressing section 110 of the piston 104 that is moving toward the vehicle lower side, or a configuration may be applied in which the switching pawl 116 is rotated faster than the movement of the piston 104 due to an impact when the pressing section 110 of the piston 104 moving toward the vehicle lower side has struck the load receiving tab 130 of the switching pawl 116.

The present exemplary embodiment is configured such that the piston 104 is disposed in line facing the MGG 98 at the vehicle lower side of the MGG 98. However, a configuration may be applied in which the piston 104 is disposed offset toward the vehicle front-rear direction side or the vehicle width direction side with respect to the MGG 98, and a flow path of gas from the MGG 98 to the piston 104 curves (bents) toward this vehicle front-rear direction side or this vehicle width direction side.

The present exemplary embodiment is configured such that the load receiving tab 130 of the switching pawl 116 is pressed by the vehicle lower side end portion of the pressing section 110 of the piston 104. However, there is no particular limitation to the portion of the piston 104, that presses the load receiving tab 130 of the switching pawl 116, and a pressing portion that is capable of abutting and pressing the load receiving tab 130 of the switching pawl 116 may be set at a vehicle up-down direction intermediate portion of the pressing section 110 of the piston 104.

The present exemplary embodiment is configured such that the switching pawl 116 is disposed inside the placement range of the base cartridge 94 in the state in which the piston 104 has finished moving; however, configuration may be such that part of the switching pawl 116 is disposed outside the placement range of the base cartridge 94 in the state in which the piston 104 has finished moving.

Explanation follows regarding a second exemplary embodiment of the present invention, based on FIGS. 8 to 12. Note that in the below description, although reference numerals are different between the first exemplary embodiment and the second exemplary embodiment, explanations regarding structure, function, operation, location and the like of members, portions and the like that are similar to those in the first exemplary embodiment is sometimes omitted.

Figure 8:
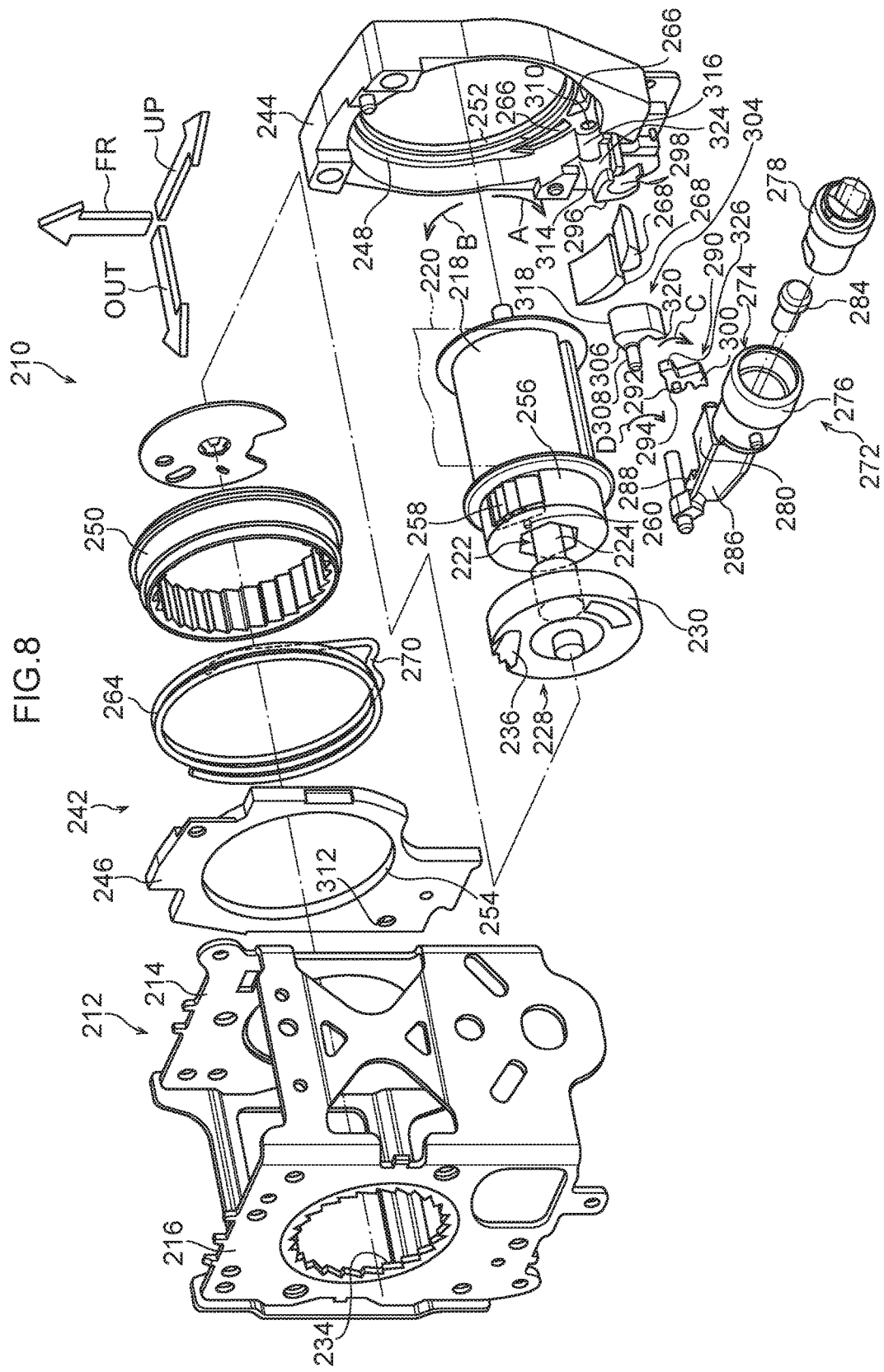
FIG. 8 is an exploded perspective view illustrating relevant portions of a webbing take-up device according to a second exemplary embodiment of the present invention.
Figure 9:
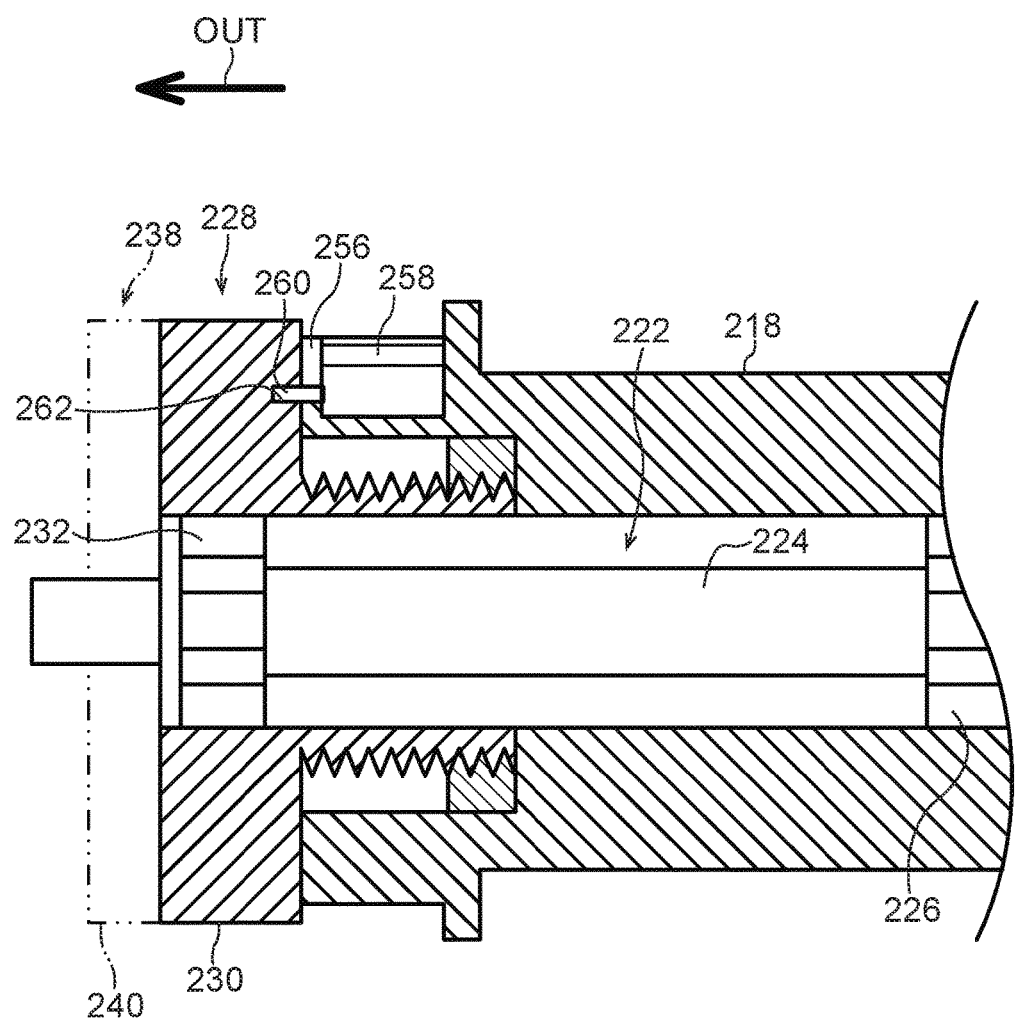
FIG. 9 is a cross-section of a spool and a lock base sectioned along their central axial line.
Figure 10:
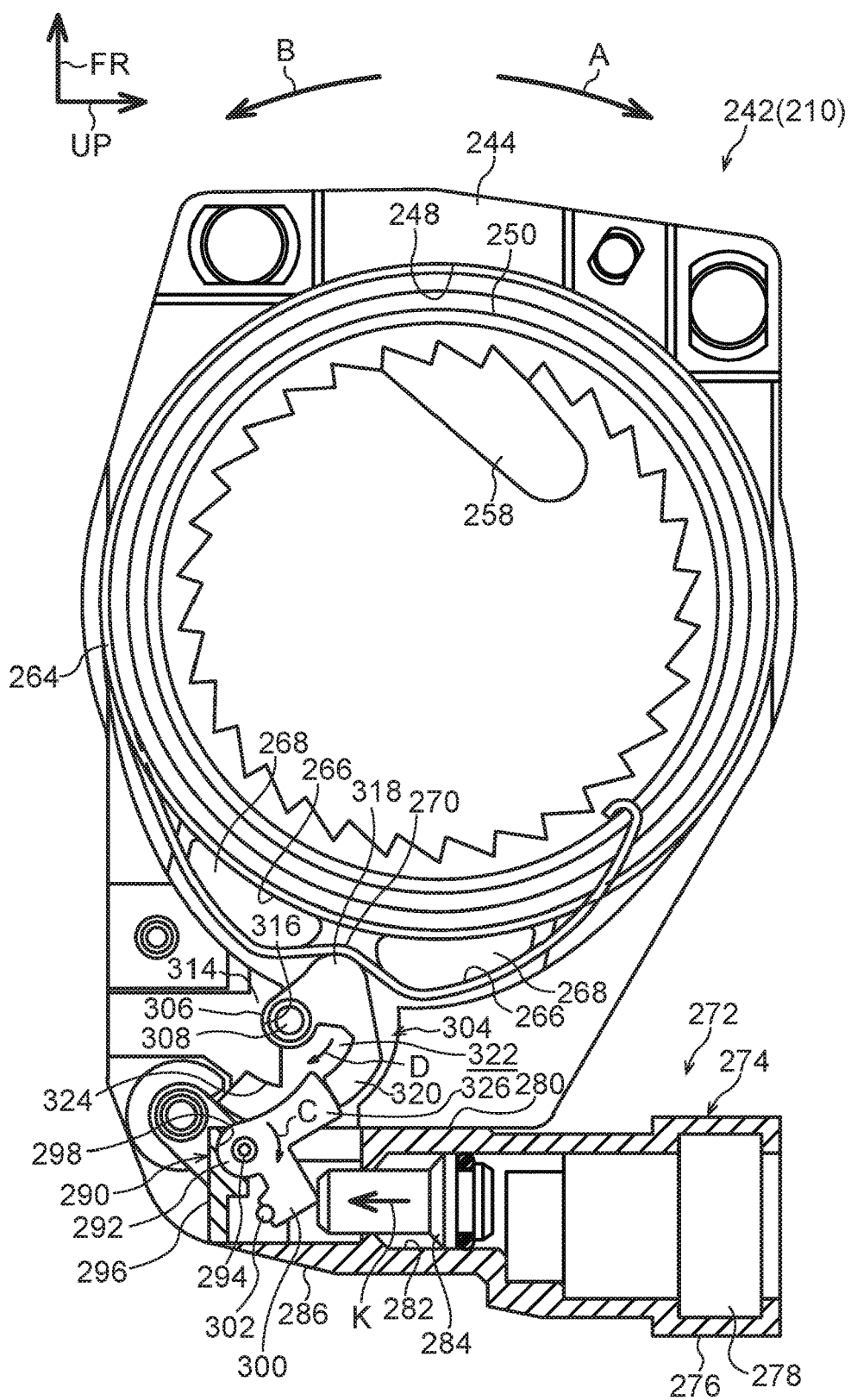
FIG. 10 is a side view illustrating an initial state of a drive device, an SFL lever, and a switching pawl from the vehicle width direction outside.

As illustrated in FIGS. 8 and 10, a webbing take-up device 210 includes a selectable force limiter mechanism 242. Note that in the below description, "selectable force limiter" is abbreviated to "SFL". The SFL mechanism 242 includes SFL housing 244, serving as a base member. An SFL sheet 246, serving as a cover member, is provided at the vehicle width direction outside of the SFL housing 244.

A pair of piece insertion holes 266 are formed inside the base ring accommodating section 248 of the SFL housing 244 at the vehicle rear side of the base ring 250. The pair of piece insertion holes 266 are formed side-by-side in the circumferential direction of the base ring 250. Pieces 268 are inserted into the respective piece insertion holes 266 from the vehicle width direction outside. Vehicle width direction outside portions of the pieces 268 that have been inserted into the respective piece insertion holes 266 project out further toward the vehicle width direction outside than the piece insertion holes 266.

A first wound portion which is at the length direction leading end side of the wire 264 passes at the vehicle rear side of the pieces 268, whereas a part of the wire 264 that is further toward the length direction base end side than the first wound portion, at the length direction leading end side of the wire 264, passes at the vehicle front side of the pieces 268. A bent portion 270 is formed in the first wound portion at the length direction leading end side of the wire 264. The bent portion 270 is bent in a protruding shape toward the vehicle front side, and the bent portion 270 enters between the two pieces 268 from the vehicle rear side.

As illustrated in FIGS. 8 and 10, a drive device 272, configuring a prevention release section, is provided at the SFL housing 244. The drive device 272 includes a base cartridge 274 serving as a retaining member. The base cartridge 274 is formed by zinc die-cast, for example, and the base cartridge 274 is coupled to and retained by the SFL housing 244, the SFL sheet 246 using a coupling pin or the like. The base cartridge 274 includes a micro gas generator attachment section 276. Note that in the below description, "micro gas generator" is abbreviated to "MGG". The MGG attachment section 276 is formed overall in a circular tube shape, and the MGG attachment section 276 has its central axial line direction along the vehicle up-down direction. An MGG 278, serving as a drive section, is provided inside the MGG attachment section 276.

As illustrated in FIG. 10, a cylinder section 280 is formed at the vehicle lower side of the MGG attachment section 276 at the base cartridge 274. A cylinder hole 282 is formed piercing through the cylinder section 280 in the vehicle up-down direction. The cylinder hole 282 is communicated to the inside of the MGG attachment section 276, and gas ejected from the MGG 27 is supplied into the cylinder hole 282.

A piston 284, serving as a movable member, is provided inside the cylinder hole 282 of the cylinder section 280 of the base cartridge 274. A vehicle lower side portion of the piston 284 projects out toward the vehicle lower side from a vehicle lower side end portion of the cylinder section 280, and the piston 284 is moved toward the vehicle lower side by pressure of gas when gas ejected from the MGG 278 is supplied into the cylinder hole 282.

An extension section 286 extends out toward the vehicle lower side from the vehicle lower side end portion of the cylinder section 280 of the base cartridge 274. A piston stopper section 288 is formed on the extension section 286. The piston stopper section 288 is formed even further toward the vehicle lower side than the vehicle lower side end portion of the cylinder section 280 of the base cartridge 274. A vehicle upper side face of the piston stopper section 288 faces a portion of the piston 284 that is further toward the vehicle width direction outside than the vehicle width direction center at the vehicle lower side end portion of the piston 284. Thus, the piston 284 that has moved toward the vehicle lower side under the pressure of gas ejected from the MGG 278 abuts the vehicle upper side face of the piston stopper section 288 of the base cartridge 274, and is thereby prevented from moving toward the vehicle lower side.

As illustrated in FIG. 8, a switching pawl 290, configuring a prevention release section serving as a prevention member, is provided at the vehicle width direction inside of the piston stopper section 288 at the base cartridge 274. As illustrated in FIG. 10, the switching pawl 290 includes a pawl base section 292. The pawl base section 292 has a substantially circular plate shape, and the pawl base section 292 has its thickness direction along the vehicle width direction. A pawl support shaft 294 is formed on a vehicle width direction outside face of the pawl base section 292 of the switching pawl 290. The pawl support shaft 294 is formed in the center of the vehicle width direction outside face of the pawl base section 292, and is inserted into a pawl shaft receiving hole (not illustrated in the drawings) formed in the piston stopper section 288. The switching pawl 290 is thereby supported by the piston stopper section 288 of the base cartridge 274 (see FIG. 8) so as to be capable of rotating about the pawl support shaft 294.

As illustrated in FIG. 10, a housing-side pawl shaft receiving section 296, corresponding to the pawl base section 292 of the switching pawl 290 and serving as a prevention member support section is formed in the SFL housing 244. The housing-side pawl shaft receiving section 296 includes a pawl support face 298. The pawl support face 298 is curved in a recessed shape with the pawl support shaft 294 of the switching pawl 290 as the center of curvature. An outside face of the pawl base section 292 of the switching pawl 290 abuts the pawl support face 298 of the housing-side pawl shaft receiving section 296, and the switching pawl 290 is also supported by the housing-side pawl shaft receiving section 296 of the SFL housing 244 so as to be capable of rotating about the pawl support shaft 294.

The switching pawl 290 includes a load receiving tab 300. The load receiving tab 300 extends out toward the radial direction outside of the pawl base section 292 from the pawl base section 292 of the switching pawl 290. A leading end portion of the load receiving tab 300 of the switching pawl 290 faces a portion, which is further toward the vehicle width direction inside than the vehicle width direction center, of the vehicle lower side end portion of the piston 284, at further toward the vehicle upper side than the vehicle upper side face of the piston stopper section 288 of the base cartridge 274. Thus, when the piston 284 is moved toward the vehicle lower side by the pressure of gas ejected from the MGG 278, the load receiving tab 300 of the switching pawl 290 is pressed toward the vehicle lower side by the vehicle lower side end portion of the piston 284. The switching pawl 290 is thereby rotated in a prevention release direction (the arrow C direction in FIG. 10 and so on), this being one direction about the pawl support shaft 294.

As illustrated in FIG. 10, a switching shear pin 302 is provided at the vehicle lower side of the load receiving tab 300 of the switching pawl 290, which is in an initial state. The switching shear pin 302 is formed projecting out from the SFL housing 244. The switching pawl 290 is prevented from rotating in the prevention release direction (the arrow C direction in FIG. 10 and so on) in the initial state due to the switching shear pin 302 being abutted by the load receiving tab 300 of the switching pawl 290 from the vehicle lower side. The switching pawl 290 is accordingly able to rotate in the prevention release direction when the switching shear pin 302 is broken by receiving load from the load receiving tab 300 of the switching pawl 290 (see FIG. 11).

As illustrated in FIG. 8, an SFL lever 304, serving as a deformation amount changing member, is provided at the vehicle front side of the switching pawl 290. The SFL lever 304 includes a lever base section 306. The lever base section 306 has a substantially circular plate shape, and the lever base section 306 has its thickness direction along the vehicle width direction. Lever support shafts 308 (only the lever support shaft 308 at the vehicle width direction outside is illustrated in FIG. 8 and so on) are respectively formed on respective vehicle width direction side faces of the lever base section 306. The lever support shaft 308 (not illustrated in the drawings) at the vehicle width direction inside of the SFL lever 304 is inserted into a housing-side lever shaft receiving hole 310 formed in the SFL housing 244, and the lever support shaft 308 at the vehicle width direction outside of the SFL lever 304 is inserted into a sheet-side lever shaft receiving hole 312 formed in the SFL sheet 246. The SFL lever 304 is thereby capable of rotating about the lever support shafts 308.

As illustrated in FIGS. 8 and 10, a housing-side lever shaft receiving section 314 is formed in the SFL housing 244, at the vehicle lower side of the lever base section 306 of the SFL lever 304. As illustrated in FIG. 10, the housing-side lever shaft receiving section 314 includes a lever support face 316. The lever support face 316 is curved in a recessed shape with the lever support shafts 308 of the SFL lever 304 as the center of curvature. An outside face of the lever base section 306 of the SFL lever 304 abuts the lever support face 316 of the housing-side lever shaft receiving section 314, and the SFL lever 304 is also supported by the housing-side lever shaft receiving section 314 of the SFL housing 244 so as to be capable of rotating about the lever support shafts 308.

The SFL lever 304 includes a lever engagement portion 318. The lever engagement portion 318 extends out from the lever base section 306 of the SFL lever 304 toward the radial direction outside of the lever base section 306. In an initial state of the SFL lever 304 (the state illustrated in FIGS. 10 and 12), an extension direction (length direction) leading end portion of the lever engagement portion 318 of the SFL lever 304 is entered between the two pieces 268 which are inserted in the piece insertion holes 266 of the SFL housing 244. The extension direction leading end portion of the lever engagement portion 318 of the SFL lever 304 abuts the bent portion 270 of the wire 264 from the vehicle rear side. Thus, when the wire 264 is rotated in the pull-out direction together with the base ring 250 in this state, the wire 264 that is further toward the length direction base end side than the bent portion 270 is pressed and deformed into a wave shape by (between) the two pieces 268 and the lever engagement portion 318 of the SFL lever 304.

When the wire 264 that is further toward the length direction base end side than the bent portion 270 is pressed and deformed into a wave shape in this manner, load is imparted to the lever engagement portion 318 of the SFL lever 304 from the wire 264. The mechanical strength and so on of the SFL lever 304 is set such that deformation and so on does not occur due to this load from this wire 264, and therefore the SFL lever 304 is heavier than the switching pawl 290.

Figure 12:
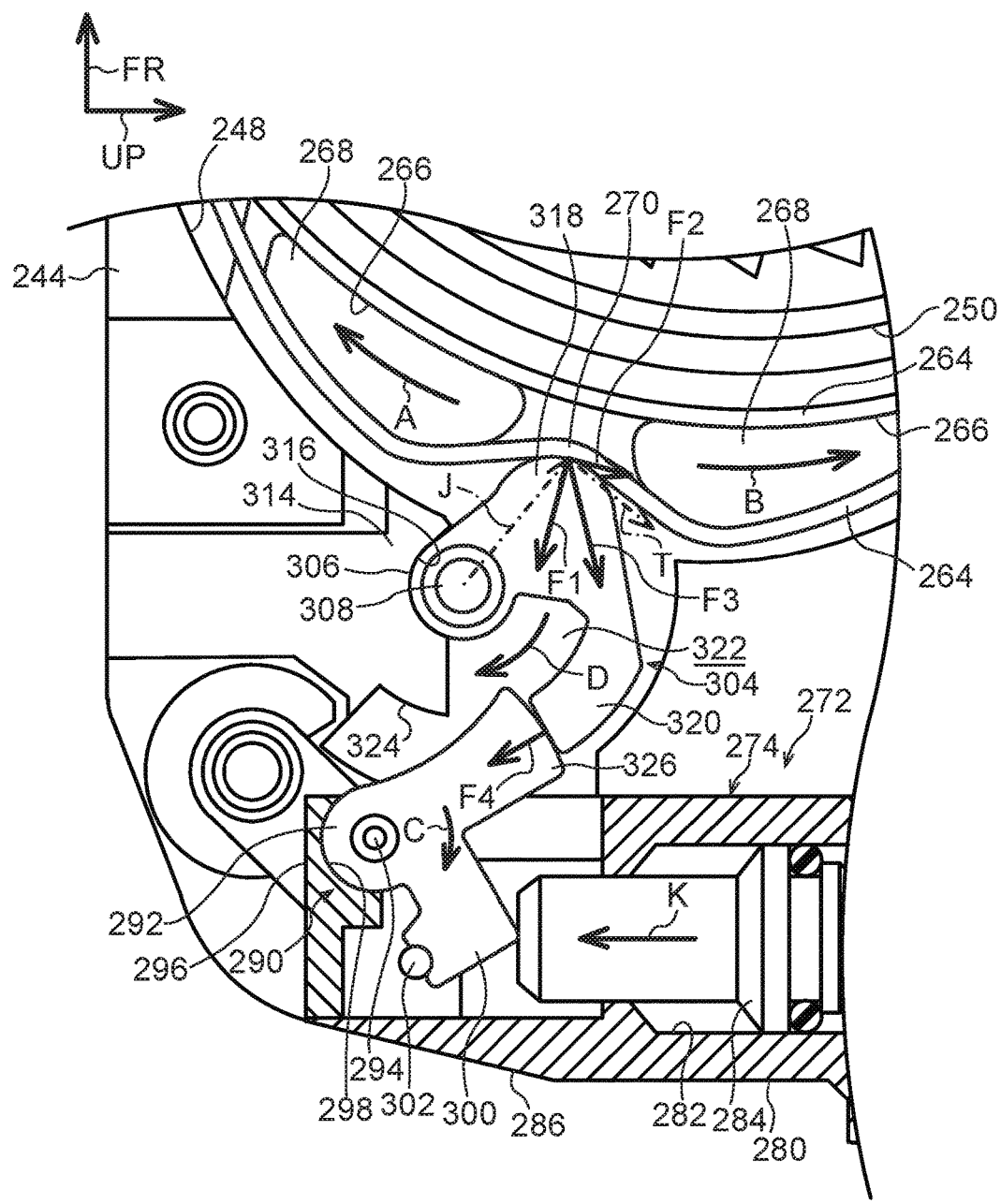
FIG. 12 is an enlarged side view illustrating an initial state of an SFL lever and a switching pawl.

As illustrated in FIGS. 10 and 12, in the initial state of the SFL lever 304, the extension direction leading end portion of the lever engagement portion 318 is positioned further toward the vehicle front upper side (the arrow J direction side indicated by a dotted-dashed line in FIG. 12) than the lever support shafts 308 (the rotation center of the lever base section 306) of the SFL lever 304. When the SFL lever 304 is rotated in a deformation amount changing direction (the arrow D direction in FIG. 12 and so on), this being one direction about the lever support shafts 308 of the lever base section 306, the extension direction leading end portion of the lever engagement portion 318 comes out from between the both pieces 268. Moreover, in the initial state of the SFL lever 304, at the opposite side of the lever support shafts 308 of the SFL lever 304 to the extension direction leading end portion of the lever engagement portion 318, the lever base section 306 of the SFL lever 304 abuts the lever support face 316 of the housing-side lever shaft receiving section 314 of the SFL housing 244.

The SFL lever 304 further includes an abutting tab 320. The abutting tab 320 is provided at the deformation amount changing direction side (the arrow D direction side in FIG. 10 and so on) of the lever engagement portion 318 of the SFL lever 304, and an end portion of the abutting tab 320 at the opposite side to the deformation amount changing direction is connected to the lever engagement portion 318. The abutting tab 320 is formed in a plate shape, and the abutting tab 320 has its thickness direction along the vehicle width direction. The abutting tab 320 is formed separately to the lever base section 306 at the radial direction outside of the lever base section 306. Faces at both width direction sides of the abutting tab 320 (the lever base section 306 side and the opposite side to the lever base section 306 of the abutting tab 320) curve with the lever support shafts 308 of the lever base section 306 of the SFL lever 304 as the center or curvature. A substantially fan-shaped gap 322 with the lever support shafts 308 as the center of curvature is thereby formed between the lever base section 306 and the abutting tab 320 of the SFL lever 304.

A shaft receiving extension section 324, corresponding to the gap 322 of the SFL lever 304, is formed at the housing-side lever shaft receiving section 314 of the SFL housing 244. The shaft receiving extension section 324 is abutted by the outside face of the lever base section 306 of the SFL lever 304, as part of the housing-side lever shaft receiving section 314, and supports the lever base section 306 so as to allow rotating. When the SFL lever 304 is rotated by a specific angle or greater in the deformation amount changing direction, the shaft receiving extension section 324 enters the gap 322 between the lever base section 306 and the abutting tab 320 of the SFL lever 304.

A lever stopper tab 326, corresponding to the abutting tab 320 of the SFL lever 304, is formed at the switching pawl 290. The lever stopper tab 326 extends out toward the radial direction outside of the pawl base section 292 of the switching pawl 290, and in the initial state of the SFL lever 304 and the switching pawl 290, an extension direction leading end portion of the lever stopper tab 326 abuts a deformation amount changing direction side end portion of the abutting tab 320 of the SFL lever 304. The SFL lever 304 is thereby prevented from rotating in the deformation amount changing direction by the switching pawl 290.

In the initial state of the SFL lever 304 and the switching pawl 290, an extension direction of the lever stopper tab 326 from the pawl base section 292 of the switching pawl 290 runs along a tangential direction to the rotating of the SFL lever 304 at the deformation amount changing direction side end portion of the abutting tab 320 of the SFL lever 304. The extension direction leading end portion of the lever stopper tab 326 is curved with the pawl support shaft 294 of the switching pawl 290 as the center of curvature.

In the initial state of the SFL lever 304 and the switching pawl 290, the outside face of the pawl base section 292 of the switching pawl 290 abuts the pawl support face 298 of the housing-side pawl shaft receiving section 296, at the opposite side of the pawl base section 292 of the switching pawl 290 to the extension direction leading end portion of the lever stopper tab 326.

Operation and Advantageous Effects of Present Exemplary Embodiment

When, in a state in which rotation of the spool 218 in the pull-out direction has been prevented by the lock mechanism 228, rotation force in the pull-out direction imparted to the spool 218 from webbing 220 becomes greater than a rotation load required to twist and deform a shaft section 224 of a torsion bar 222 about its central axial line, a spool-side coupling portion 226 of the torsion bar 222 is rotated in the pull-out direction relative to a lock base-side coupling portion 232, and the shaft section 224 of the torsion bar 222 is thereby twisted and deformed. Part of the rotation force in the pull-out direction of the spool 218 is thereby absorbed. When the spool 218 is accordingly rotated in the pull-out direction (the arrow B direction in FIG. 8 and so on), the webbing 220 is pulled out from the spool 218. The body of the occupant can move under inertia toward the vehicle front side by the amount of the pulled-out length of the webbing 220 from the spool 218.

When the spool 218 is rotated in the pull-out direction in the state in which rotation of the lock base 230 in the pull-out direction has been prevented, the shear pin 260 of the SFL pawl 258 provided to the pawl accommodating section 256 of the spool 218 is guided and moved in the guide hole 262 of the lock base 230 of the lock mechanism 228. The SFL pawl 258 is thereby moved in a direction nearing the base ring 250, and the ratchet teeth on the SFL pawl 258 mesh with the ratchet teeth on the inside face of the base ring 250. The base ring 250 is thereby coupled to the spool 218.

In this state, when rotation force in the pull-out direction imparted to the spool 218 from the webbing 220 becomes greater than the sum of the rotation load required to twist and deform the shaft section 224 of the torsion bar 222 about its central axial line, and the rotation load required to press the wire 264 into a wave shape between the two pieces 268 and the lever engagement portion 318 of the SFL lever 304 and to deform the wire 264, the spool 218 is further rotated in the pull-out direction (the arrow B direction in FIG. 8 and so on). The webbing 220 is thereby pulled out further from the spool 218. The body of the occupant can move further under inertia toward the vehicle front side by the amount of the pulled-out length of the webbing 220 from the spool 218.

When the base ring 250 is rotated in the pull-out direction together with the spool 218 in the state in which the base ring 250 and the spool 218 have been coupled together by the SFL pawl 258, the length direction leading end portion of the wire 264 is pulled by the base ring 250, and the wire 264 is rotated in the pull-out direction together with the base ring 250. When the wire 264 is rotated in the pull-out direction in this manner, the wire 264 that is further toward the length direction base end side than the bent portion 270 is led toward the vehicle rear side of the pieces 268, and is then led between the two pieces 268 and the lever engagement portion 318 of the SFL lever 304. The wire 264 that is further toward the length direction base end side than the bent portion 270 is thereby pressed into a wave shape and deformed between the two pieces 268 and the lever engagement portion 318 of the SFL lever 304, and part of the rotation force in the pull-out direction of the spool 218 is also absorbed by this deformation of the wire 264.

However, when the ECU determines that the build of the occupant is less than a standard build based on the build detection signal output from the build detection section, the activation signal output from the ECU during a vehicle emergency switches from low level to high level, and the MGG 278 is thereby actuated. When the MGG 278 is actuated, gas is ejected from the vehicle lower side end portion of the MGG 278, and the gas is supplied into the cylinder hole 282 of the cylinder section 280 of the base cartridge 274.

Figure 11:
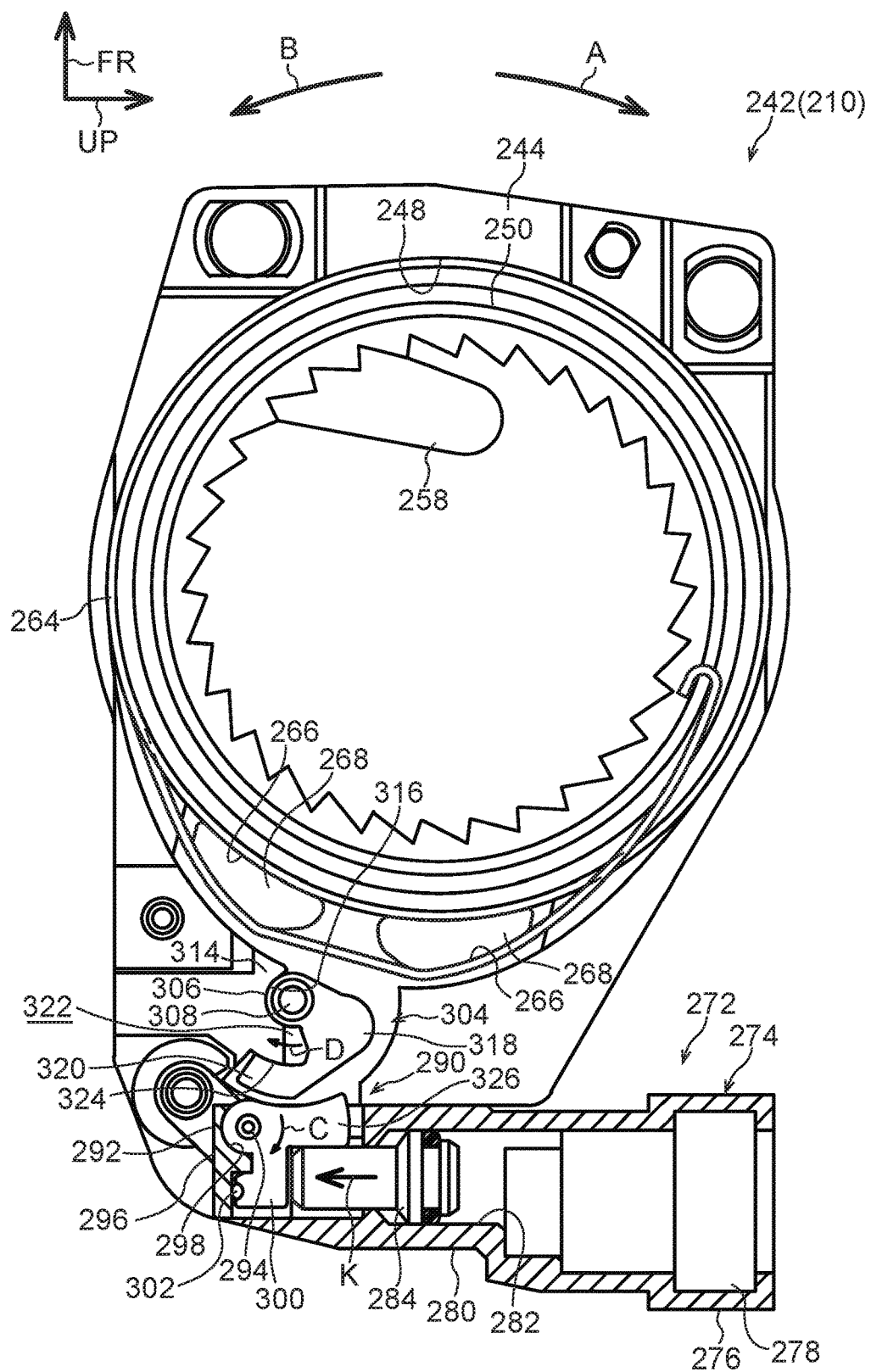
FIG. 11 is a cross-section corresponding to FIG. 10, illustrating a state in which an SFL lever has been rotated in a deformation amount changing direction.

When the pressure inside the cylinder hole 282 of the cylinder section 280 rises as a result, the piston 284 inside the cylinder hole 282 is moved toward the vehicle lower side (the arrow K direction side in FIGS. 10 to 12). When the load receiving tab 300 of the switching pawl 290 is accordingly pressed toward the vehicle lower side by the piston 284, the switching shear pin 302 of the SFL housing 244 is broken by the load receiving tab 300 of the switching pawl 290, and the switching pawl 290 receiving load from the piston 284 is rotated in the prevention release direction (the arrow C direction in FIGS. 10 to 12 and so on).

Thus, the extension direction leading end portion of the lever stopper tab 326 of the switching pawl 290 and the deformation amount changing direction side end portion of the abutting portion 320 of the SFL lever 304 are released from abutting each other. As illustrated in FIG. 12, when the base ring 250 is rotated in the pull-out direction together with the spool 218 in this state, a combined force (resultant force) F3 configured of a pressing force F1 based on tension according to the bent portion 270 of the wire 264 attempting to stretch (extend) toward the pull-out direction side, and a friction force F2 between the extension direction leading end portion of the lever engagement portion 318 and the bent portion 270 of the wire 264, is imparted to the extension direction leading end portion of the lever engagement portion 318 of the SFL lever 304. The direction of the combined force F3 is toward the vehicle upper rear side.

In the initial state of the SFL lever 304, the lever support shafts 308 of the lever base section 306, these being the rotation center of the lever base section 306 of the SFL lever 304, are positioned further toward the vehicle lower rear side (the opposite side to the arrow J direction indicated by the dotted-dashed line in FIG. 12) than the extension direction leading end portion of the lever engagement portion 318. The direction of rotation torque (the arrow T direction indicated by a dotted-dashed line in FIG. 12) at the extension direction leading end portion of the lever engagement portion 318 when the SFL lever 304 is rotated in the deformation amount changing direction (the arrow D direction in FIG. 12 and so on) in this state is thereby toward the vehicle upper rear side.

Thus, when the combined force F3, configured of the pressing force F1 and the friction force F2 imparted from the bent portion 270 of the wire 264, is imparted to the extension direction leading end portion of the lever engagement portion 318 of the SFL lever 304, rotation torque is generated in the SFL lever 304 at the deformation amount changing direction side (the arrow D direction side in FIG. 12 and so on), and the SFL lever 304 is thereby rotated in the deformation amount changing direction.

In the state in which the SFL lever 304 has been rotated in the deformation amount changing direction in this manner, the wire 264 is not pressed and deformed by the lever engagement portion 318 of the SFL lever 304. Thus, deformation of the wire 264 by the SFL lever 304 and the pieces 268 is suppressed in this state. This enables the absorption amount of rotation force of the spool 218 in the pull-out direction due to deformation of the wire 264 to be reduced, and enables the rotation force required to rotate the spool 218 in the pull-out direction to be less than when the SFL lever 304 is in the initial state.

Note that in the present exemplary embodiment, the SFL lever 304 is rotated in the deformation amount changing direction (the arrow D direction in FIG. 12 and so on) by the combined force F3, configured of the pressing force F1 and the friction force F2, imparted from the bent portion 270 of the wire 264. Thus, it is sufficient as long as the pressure of gas generated by the MGG 278 moves the piston 284 toward the vehicle lower side, and the switching pawl 290 that is pressed by the vehicle lower side end portion of the piston 284 can be rotated in the prevention release direction (the arrow C direction in FIG. 12 and so on). Moreover, the switching pawl 290 is lighter than the SFL lever 304.

Thus, the configuration of the present exemplary embodiment enables the power output of the MGG 278 to be reduced compared to a configuration in which an SFL lever is directly pressed by a piston, such that the SFL lever is rotated, and a lever engagement portion comes out from between two pieces. This enables the MGG 278 to be made more compact and lighter in weight, enabling the drive device 272 to be made more compact and lighter in weight and thereby the webbing take-up device 210 to be made more compact and lighter in weight.

In the present exemplary embodiment, the extension direction leading end portion of the lever stopper tab 326 of the switching pawl 290 abuts the deformation amount changing direction side end portion of the abutting tab 320 of the SFL lever 304, and the SFL lever 304 is thereby prevented from rotating in the deformation amount changing direction by the switching pawl 290. Thus, as illustrated in FIG. 12, when the SFL lever 304 attempts to rotate in the deformation amount changing direction in the state in which rotating of the SFL lever 304 has been prevented by the switching pawl 290, a load F4 from the deformation amount changing direction side end portion of the abutting tab 320 of the SFL lever 304 is imparted to the extension direction leading end portion of the lever stopper tab 326 of the switching pawl 290. The direction of this load F4 is a tangential direction to the rotating of the SFL lever 304 at the extension direction leading end portion of the lever stopper tab 326.

Note that, in the initial state of the SFL lever 304 and the switching pawl 290, the extension direction of the lever stopper tab 326 of the switching pawl 290 from the pawl base section 292 is a tangential direction of the rotating of the SFL lever 304 at the deformation amount changing direction side end portion of the abutting tab 320 of the SFL lever 304. Thus, the direction of the force F4 at the extension direction leading end portion of the lever stopper tab 326 of the switching pawl 290, received from the deformation amount changing direction side end portion of the abutting tab 320 of the SFL lever 304, is the opposite direction to the extension direction of the lever stopper tab 326 of the switching pawl 290. Thus, even when the extension direction leading end portion of the lever stopper tab 326 of the switching pawl 290 receives the force F4 from the deformation amount changing direction side end portion of the abutting tab 320 of the SFL lever 304, deformation and so on of the lever stopper tab 326 is less liable to occur. This enables the switching pawl 290 to be set with a low mechanical strength, and enables the switching pawl 290 to be made more compact and lighter in weight. This also enables the power output of the MGG 278 to be reduced.

In the initial state of the SFL lever 304 and the switching pawl 290, at the opposite side of the pawl support shaft 294 (namely, the rotating center of the pawl base section 292) of the switching pawl 290 to the extension direction leading end portion of the lever stopper tab 326, the outside face of the pawl base section 292 of the switching pawl 290 abuts the pawl support face 298 of the housing-side pawl shaft receiving section 296 of the SFL housing 244 (the pawl support shaft 294 is sandwiched by the outside face of the pawl base section 292 and the extension direction leading end portion of the lever stopper tab 326). Thus, the load F4 received from the deformation amount changing direction side end portion of the abutting tab 320 of the SFL lever 304 is transmitted to the housing-side pawl shaft receiving section 296 of the SFL housing 244 through the lever stopper tab 326 of the switching pawl 290.

This enables the load F4 input to the lever stopper tab 326 of the switching pawl 290 to be supported by the housing-side pawl shaft receiving section 296 of the SFL housing 244. This also enables the switching pawl 290 to be set with a low mechanical strength, and enables the switching pawl 290 to be made more compact and lighter in weight. This also enables the power output of the MGG 278 to be reduced.

The pawl base section 292 of the switching pawl 290 is supported by the housing-side pawl shaft receiving section 296 of the SFL housing 244 so as to be capable of rotating. Thus, the mechanical strength (shear strength) of the pawl support shaft 294 of the switching pawl 290 does not need to be of an amount capable of withstanding the load F4 received from the deformation amount changing direction side end portion of the abutting tab 320 of the SFL lever 304. This enables the pawl support shaft 294 to be made thinner and smaller, which also enables the switching pawl 290 to be made more compact and lighter in weight, enabling the power output of the MGG 278 to be made reduced.

In the present exemplary embodiment, the lever base section 306 of the SFL lever 304 is supported by the housing-side lever shaft receiving section 314 formed at the SFL housing 244 so as to be capable of rotating. This enables the lever support shafts 308 of the SFL lever 304 to be made thinner and smaller. This enables the SFL lever 304 to be made more compact and lighter in weight.

When the SFL lever 304 is rotated in the deformation amount changing direction by a specific angle or greater, the shaft receiving extension section 324 of the housing-side lever shaft receiving section 314 of the SFL housing 244 enters (becomes entered state in) the gap 322 between the lever base section 306 and the abutting tab 320 of the SFL lever 304. This enables the SFL lever 304 to be rotated in the deformation amount changing direction until the deformation amount changing direction side end portion of the abutting tab 320 of the SFL lever 304 is positioned on the shaft receiving extension section 324 of the SFL housing 244 at the opposite side of the rotating center of the SFL lever 304. This enables a support range of the lever base section 306 of the SFL lever 304 by the housing-side lever shaft receiving section 314 of the SFL housing 244, including the shaft receiving extension section 324, to be increased, while securing a rotating range of the SFL lever 304.

The present exemplary embodiment is configured such that the SFL lever 304 is supported by the housing-side lever shaft receiving section 314 formed at the SFL housing 244 so as to be capable of rotating, and the SFL lever 304 is supported by the housing-side lever shaft receiving hole 310 formed to the SFL housing 244 and the sheet-side lever shaft receiving hole 312 formed to the SFL sheet 246 so as to be capable of rotating. However, there is no particular limitation to the configuration supporting the SFL lever 304, and a configuration may be applied in which the SFL lever 304 is only supported so as to be capable of rotating by the housing-side lever shaft receiving section 314, or a configuration may be applied in which the SFL lever 304 is only supported so as to be capable of rotating by the housing-side lever shaft receiving hole 310 and the sheet-side lever shaft receiving hole 312.

The present exemplary embodiment is configured such that the SFL lever 304 serving as the deformation amount changing member is rotated by force received from the bent portion 270 of the wire 264, and the deformation amount of the wire 264 is changed accordingly. However, displacement of the deformation amount changing member is not limited to rotating, and displacement of the deformation amount changing member by force received from the bent portion 270 of the wire 264 may be movement in a straight line, for example.

The present exemplary embodiment is configured such that the SFL lever 304 serving as the deformation amount changing member is rotated by force received from the bent portion 270 of the wire 264. However, for example, in a case in which the MGG 278 serving as the release prevention device is actuated prior to the base ring 250 being rotated in the pull-out direction together with the spool 218, and the extension direction leading end portion of the lever stopper tab 326 of the switching pawl 290, serving as the prevention member of the release prevention device, and the deformation amount changing direction side end portion of the abutting tab 320 of the SFL lever 304 are released from abutting each other, a configuration may be applied in which the SFL lever 304 is rotated under its own weight. It is thereby sufficient that the deformation amount changing member is capable of being displaced in the deformation amount changing direction by the load from the force limiter member, and configuration may be such that the deformation amount changing member is not displaced in the deformation amount changing direction by the load from the force limiter member, depending on the actuation timing of the release prevention device or the like.

The present exemplary embodiment is configured such that the wire 264 is the force limiter member. However, as long as configuration is such that the force limiter member is deformed by the spool 218 being rotated in the pull-out direction in a state in which the force limiter member has been coupled to the spool 218, there is no limitation to this specific mode, and for example, the force limiter member may be a rod shaped member such as the torsion bar 22.

Note that the first and second exemplary embodiments are configured such that the MGG 98, 278 is a drive device, and the pressure of gas ejected from the MGG 98, 278 is a drive force. However, the drive force may be an urging force of a piston urging device in which the piston urging device such as a compression coil spring serves as the drive device, or the drive force may be rotation force or the like output from a motor in which the motor serves as the drive device. The drive force may also be magnetic force generated by passing current through (energizing) a solenoid in which the solenoid serves as the drive device, and a plunger that is moved by the magnetic force may be used as the movable member instead of a piston. Thus, the drive device is not limited to the MGG 98, 278, and a drive device may be applied broadly.

The webbing take-up device 10, 210 according to the first and second exemplary embodiment is employed at the rear seat of the vehicle; however, the webbing take-up device 10, 210 according to the present exemplary embodiments may be employed at a driver seat or a front passenger seat of the vehicle. In cases in which the webbing take-up device 10, 210 according to the present exemplary embodiments is employed at the driver seat or the front passenger seat of the vehicle, the orientation of the webbing take-up device 10, 210 with respect to the vehicle is sometimes different.

What is claimed is:

1. A webbing take-up device comprising:
   a spool that rotates in a pull-out direction due to a webbing being pulled out;
   a force limiter member that is capable of actuating with rotation of the spool in the pull-out direction, and that, in an actuated state, absorbs a part of a rotation force of the spool by being deformed;
   a support member that supports the force limiter member;
   a movable member that changes a deformation amount of the force limiter member by being moved;
   a drive device that is disposed with respect to the movable member on a straight line along a movement direction of the movable member, and that moves the movable member by a drive force that is output toward a movable member side; and
   a retaining member that retains the drive device, that retains the movable member so as to allow movement, and that transmits the drive force that is output from the drive device toward the movable member,
   wherein a stopper portion is formed at the retaining member, the stopper portion being directly abutted by the movable member in a state in which movement of the movable member has been prevented such that the stopper portion prevents movement of the movable member at a movement end point of the movable member, and
   wherein the stopper portion and the retaining member are a one-piece structure.

2. The webbing take-up device of claim 1, wherein:
   the movable member is formed in a columnar shape with an axial direction thereof along the movement direction; and
   an end portion of the movable member, which is at a movement direction side of the movable member, abuts the retaining member in the state in which movement has been prevented.

3. The webbing take-up device of claim 2, further comprising:
   a deformation amount changing member that is provided so as to be able to deform the force limiter member, and that changes a deformation amount of the force limiter member by being displaced; and a displacement prevention member that prevents displacement of the deformation amount changing member, and that releases prevention of displacement of the deformation amount changing member by being pressed and moved by the end portion of the movable member at the movement direction side.

4. The webbing take-up device of claim 3, wherein the displacement prevention member is separated from the movable member in a state in which the movable member has reached the movement end point.

5. The webbing take-up device of claim 1, wherein the retaining member includes:
  a movable member retaining section inside which the movable member is retained and is movable;
  an attachment section at which the drive device is provided, and the stopper portion, and
  the retaining member, the movable member retaining section, the attachment section and the stopper portion are the one-piece structure.

* * * * *